United States Patent
Kobayashi

(10) Patent No.: US 10,384,195 B2
(45) Date of Patent: Aug. 20, 2019

(54) ARTIFICIAL PHOTOSYNTHESIS MODULE

(71) Applicants: FUJIFILM Corporation, Tokyo (JP); Japan Technological Research Association of Artificial Photosynthetic Chemical Process, Tokyo (JP)

(72) Inventor: Hiroyuki Kobayashi, Kashiwa (JP)

(73) Assignees: FUJIFILM Corporation, Tokyo (JP); JAPAN TECHNOLOGICAL RESEARCH ASSOCIATION OF ARTIFICIAL PHOTOSYNTHETIC CHEMICAL PROCESS, Tokyo (JP)

( * ) Notice: Subject to any disclaimer, the term of this patent is extended or adjusted under 35 U.S.C. 154(b) by 0 days.

(21) Appl. No.: 16/109,511

(22) Filed: Aug. 22, 2018

(65) Prior Publication Data

US 2018/0361363 A1 Dec. 20, 2018

Related U.S. Application Data

(63) Continuation of application No. PCT/JP2017/003987, filed on Feb. 3, 2017.

(30) Foreign Application Priority Data

Feb. 23, 2016 (JP) .................................. 2016-032263

(51) Int. Cl.
*B01J 23/847* (2006.01)
*B01J 35/02* (2006.01)
(Continued)

(52) U.S. Cl.
CPC ............. *B01J 23/847* (2013.01); *B01J 35/02* (2013.01); *C01B 3/04* (2013.01); *C25B 1/003* (2013.01);
(Continued)

(58) Field of Classification Search
CPC ......... B01J 23/847; B01J 35/02; C25B 13/04; C25B 1/003; C25B 9/00; C25B 1/04; C01B 3/04
(Continued)

(56) References Cited

U.S. PATENT DOCUMENTS 8,388,818 B1 3/2013 Menezes
9,447,508 B2 * 9/2016 Yoshida ................. C25B 1/003
(Continued)

FOREIGN PATENT DOCUMENTS

JP 52-97377 A 8/1977
JP 2013-44032 A 3/2013
(Continued)

OTHER PUBLICATIONS

International Search Report for PCT/JP2017/003987 (PCT/ISA/210) dated Mar. 14, 2017.
(Continued)

*Primary Examiner* — Nicholas A Smith
*Assistant Examiner* — Colleen M Raphael
(74) *Attorney, Agent, or Firm* — Birch, Stewart, Kolasch & Birch, LLP

(57) ABSTRACT

An artificial photosynthesis module includes an oxygen generation electrode having a first photocatalyst layer that decomposes water with light to generate oxygen, and has a first substrate, a first conductive layer, a first photocatalyst layer, and a first co-catalyst, and a hydrogen generation electrode that decomposes water with light to generate hydrogen and has a second substrate, a second conductive layer, a second photocatalyst layer, and a second co-catalyst. This provides an artificial photosynthesis module with high reaction efficiency.

10 Claims, 15 Drawing Sheets

(51) Int. Cl.
*C01B 3/04* (2006.01)
*C25B 1/04* (2006.01)
*C25B 9/00* (2006.01)
*C25B 1/00* (2006.01)
*C25B 13/04* (2006.01)

(52) U.S. Cl.
CPC ............. *C25B 1/04* (2013.01); *C25B 9/00* (2013.01); *C25B 13/04* (2013.01)

(58) Field of Classification Search
USPC .......................................................... 205/340
See application file for complete search history.

(56) References Cited

U.S. PATENT DOCUMENTS

| | | | |
|---|---|---|---|
| 2012/0267234 A1* | 10/2012 | Reece | B01J 19/127 204/157.5 |
| 2015/0068915 A1 | 3/2015 | Hoch et al. | |
| 2016/0376712 A1 | 12/2016 | Ono et al. | |
| 2017/0130346 A1* | 5/2017 | Sato | C25B 1/003 |
| 2018/0258542 A1* | 9/2018 | Yoshida | C25B 1/003 |
| 2018/0290129 A1* | 10/2018 | Kobayashi | C25B 1/04 |

FOREIGN PATENT DOCUMENTS

| | | |
|---|---|---|
| JP | 2013-213231 A | 10/2013 |
| JP | 2015-514867 A | 5/2015 |
| WO | WO 2015/137405 A1 | 9/2015 |

OTHER PUBLICATIONS

Written Opinion of the International Searching Authority for PCT/JP2017/003987 (PCT/ISA/237) dated Mar. 14, 2017.

International Preliminary Report on Patentability and Written Opinion of the International Searching Authority for PCT/JP2017/003987 (Forms PCT/IB/326, PCT/IB/373 and PCT/ISA/237) dated Sep. 7, 2018.

International Search Report for PCT/JP2017/003987 (Form PCT/ISA/210) dated Mar. 14, 2017.

\* cited by examiner

ARTIFICIAL PHOTOSYNTHESIS MODULE

CROSS-REFERENCE TO RELATED APPLICATIONS

This application is a Continuation of PCT International Application No. PCT/JP2017/003987 filed on Feb. 3, 2017, which claims priority under 35 U.S.C. § 119(a) to Japanese Patent Application No. 2016-032263 filed on Feb. 23, 2016. The above application is hereby expressly incorporated by reference, in its entirety, into the present application.

BACKGROUND OF THE INVENTION

1. Field of the Invention

The present invention relates to an artificial photosynthesis module that decomposes water with light to generate hydrogen and oxygen, and particularly, to an artificial photosynthesis module in which a plurality of oxygen generation electrodes and a hydrogen generation electrode are disposed in series in a traveling direction of light, and at least one of first substrates of a plurality of oxygen generation electrodes is transparent.

2. Description of the Related Art

Nowadays, water is decomposed using a photocatalyst to obtain gases, such as hydrogen and oxygen. For example, it is suggested that oxygen and hydrogen are produced by decomposing water using solar light energy that is renewable energy (for example, Patent Documents 1 and 2).

JP2013-213231A describes a water decomposition apparatus including a casing, a working electrode and a counter electrode on which an optical semiconductor catalyst is carried and supported, an electrolytic solution that fills the casing, and an electric current application part through which an electric current flows between the working electrode and the counter electrode. The inside of the casing is separated into an oxygen generation chamber and a hydrogen generation chamber by an electrolyte membrane, a light-receiving window is formed in the oxygen generation chamber, an electrode material serving as the working electrode and the optical semiconductor catalyst are laminated on the light-receiving window, the counter electrode is disposed in the hydrogen generation chamber, the counter electrode includes a base part fixed to the casing, and a porous part that allows the electrolytic solution to permeate therethrough, and the porous part is spaced apart from the casing within the hydrogen generation chamber.

JP2013-44032A describes a hydrogen production apparatus having a hydrogen generation unit that is provided on a back surface of a photoelectric conversion unit to generate hydrogen from an electrolytic solution, and an oxygen generation unit that is provided on the back surface of the photoelectric conversion unit to generate oxygen from the electrolytic solution. In JP2013-44032A, in a case where solar light is incident on light-receiving surfaces of the photoelectric conversion unit and the hydrogen generation unit and the oxygen generation unit come into contact with the electrolytic solution, the hydrogen generation unit and the oxygen generation unit electrolyze the electrolytic solution using an electromotive force caused by the photoelectric conversion unit receiving light, and generate hydrogen and oxygen, respectively. In JP2013-44032A, the area of at least one of the hydrogen generation unit and the oxygen generation unit is larger than the area of the light-receiving surface of the photoelectric conversion unit.

SUMMARY OF THE INVENTION

Although the water decomposition apparatus of JP2013-213231A receives light, such as solar light, to decompose water to produce hydrogen and oxygen, in the present situation, a further increase in the amount of gas generated, such as hydrogen and oxygen, is desired, and improvement in reaction efficiency is desired.

It is preferable to absorb and utilize 100% of light in an absorption wavelength region, that is, photons, in a water decomposition photocatalyst electrode like the working electrode on which the optical semiconductor catalyst of JP2013-213231A is carried and supported. However, in the related art, it is difficult to form an electrode with a film thickness to such an extent that 100% of the light in the absorption wavelength region can be absorbed because of the mobility and the carrier lifetime of carriers, for example, electrons, and holes that move inside the water decomposition photocatalyst electrode. For this reason, it is difficult to improve the reaction efficiency.

Additionally, in JP2013-213231A, the working electrode in which oxygen is generated, and the counter electrode in which hydrogen is generated are overlapped with each other in an incidence direction of the light and are disposed in tandem, the size of the working electrode in which oxygen is generated is limited, and a reaction field where oxygen is generated is limited.

As described above, in JP2013-213231A in which the working electrode and the counter electrode are overlapped with each other in the incidence direction of light, and are disposed in tandem, it is necessary to increase the area of the working electrode and the area of the counter electrode in order to increase the amounts of hydrogen and oxygen generated, and it is necessary to enlarge the water decomposition apparatus itself. In this case, it is difficult to make the reaction efficiency per installation area of the water decomposition apparatus high.

JP2013-44032A describes that the oxygen generation unit may have a catalyst surface area larger than the area of the light-receiving surface of the photoelectric conversion unit. However, in order to increase the oxygen generation amount, it is necessary to enlarge the oxygen generation unit and enlarge the apparatus itself. Even in this case, it is difficult to make the reaction efficiency per installation area of the hydrogen production apparatus high, similarly to JP2013-213231A.

An object of the invention is to solve the problems based on the aforementioned related art and provide an artificial photosynthesis module having high reaction efficiency.

In order to achieve the above-described object, the invention provides an artificial photosynthesis module comprising an oxygen generation electrode that decomposes water with light to generate oxygen and a hydrogen generation electrode that decomposes the water with the light to generate hydrogen. The oxygen generation electrode has a first substrate, a first conductive layer provided on the first substrate, a first photocatalyst layer provided on the first conductive layer, and a first co-catalyst carried and supported on at least a part of the first photocatalyst layer. The hydrogen generation electrode has a second substrate, a second conductive layer provided on the second substrate, a second photocatalyst layer provided on the second conductive layer, and a second co-catalyst carried and supported on at least a part of the second photocatalyst layer. The artificial photosynthesis module includes a plurality of the oxygen generation electrodes disposed in series in a traveling direction of the light. At least one of the first substrates of the plurality of oxygen generation electrodes is transparent.

It is preferable that the plurality of the oxygen generation electrodes and the hydrogen generation electrode are disposed in series in the traveling direction of the light.

It is preferable that the light is incident from the oxygen generation electrode side, and all of the first substrates are transparent. It is preferable that an oxygen generation electrode on which the light is first incident among the plurality of oxygen generation electrodes has the first co-catalyst on a side of the first substrate opposite to an incidence side of the light.

Additionally, it is preferable that all the plurality of oxygen generation electrodes each have the first co-catalyst on a side of the first substrate opposite to an incidence side of the light.

It is preferable that a thickness of the first photocatalyst layer of each of the plurality of oxygen generation electrodes is 300 nm or more and 2 μm or less. It is preferable that the number of the oxygen generation electrodes is 2 or more and 5 or less.

It is preferable that in a case where an absorption end of the first photocatalyst layer is defined as $\lambda_1$ and an absorption end of the second photocatalyst layer is defined as $\lambda_2$, it is preferable that $\lambda_1 < \lambda_2$ and $\lambda_2 - \lambda_1 \geq 100$ nm are satisfied.

It is preferable that the second co-catalyst of the hydrogen generation electrode is provided on the incidence side of the light of the second substrate.

According to the invention, the artificial photosynthesis module with high reaction efficiency can be obtained.

DESCRIPTION OF THE PREFERRED EMBODIMENTS

Hereinafter, an artificial photosynthesis module of the invention will be described in detail with reference to preferred embodiments illustrated in the attached drawings.

In addition, in the following, "to" showing a numerical range includes numerical values described on both sides thereof. For example, ε being a numerical value α to a numerical value β means that the range of ε is a range including the numerical value α and the numerical value β, and in a case where these are expressed by mathematical symbols, $\alpha \leq \varepsilon \leq \beta$ is satisfied.

Angles, such as "parallel," "perpendicular," and "orthogonal," include error ranges generally allowed in the technical field.

Here, the term "transparent" means that the light transmittance is at least 60% or more, preferably 80% or more, more preferably 85%, and still more preferably 90%, in a region having a wavelength of 380 to 780 nm, unless particularly mentioned.

The light transmittance is measured using "Method of Testing Transmittance, Reflectivity, Emissivity, and Solar Heat Acquisition Rate of Plate Glasses" specified to JIS R 3106-1998.

First, a photocatalyst electrode to be utilized for decomposition of water will be described.

Here, FIGS. 1 to 4 are schematic views illustrating a first configuration to a fourth configuration of the photocatalyst electrode to be utilized for the decomposition of water. In addition, in FIGS. 1 to 4, the same components will be designated by the same reference signs, and the detailed description thereof will be omitted.

Figure 1:
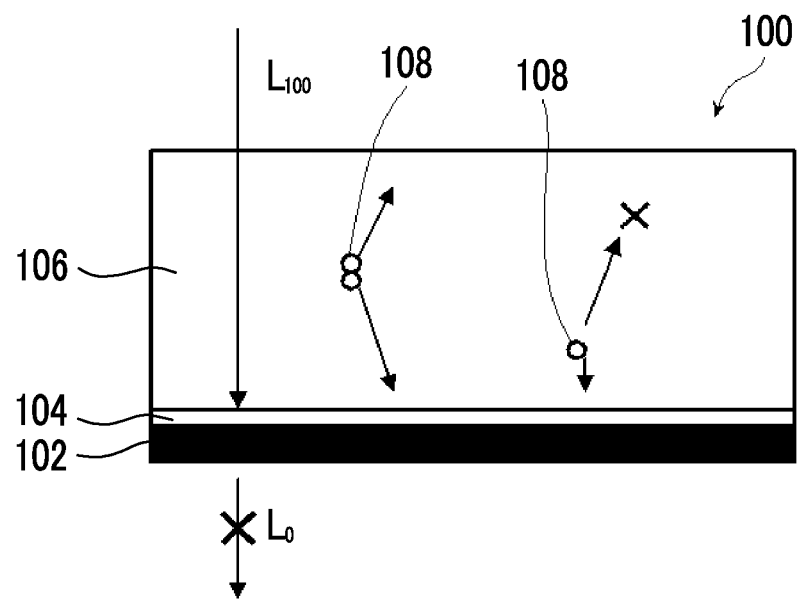
FIG. 1 is a schematic view illustrating a first configuration of a photocatalyst electrode to be utilized for decomposition of water.

In a photocatalyst electrode 100 illustrated in FIG. 1, a substrate 102, a conductive layer 104, and a photocatalyst layer 106 are laminated in order. Due to light $L_{100}$ in an absorption wavelength region that has been incident on the photocatalyst layer 106, electrons or holes are generated as carriers 108 in the photocatalyst layer 106. However, due to the mobility and the carrier lifetime of the carriers 108, it is difficult to transport the carriers 108 up to a film surface of the photocatalyst layer 106 without deactivating the carriers 108. For this reason, the photocatalyst layer 106 cannot have a film thickness to such an extent that 100% of the light in the absorption wavelength region can be absorbed.

In a case where the substrate 102 and the conductive layer 104 are not transparent, the light $L_{100}$ not absorbed in the photocatalyst layer 106 is reflected or absorbed into heat in the substrate 102. In addition, in the photocatalyst electrode 100, the light $L_{100}$ incident on the photocatalyst layer 106 is not transmitted through the substrate 102. This is designated by reference sign $L_0$.

Figure 2:
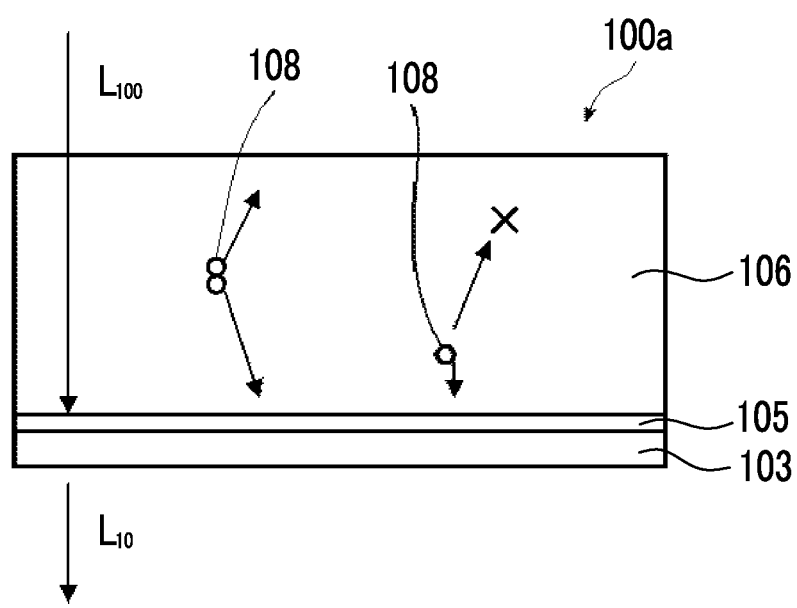
FIG. 2 is a schematic view illustrating a second configuration of the photocatalyst electrode to be utilized for the decomposition of water.

Even in a case where a substrate 103 and a conductive layer 105 are made transparent as in a photocatalyst electrode 100a illustrated in FIG. 2, similar to the photocatalyst electrode 100 illustrated in FIG. 1, due to the mobility and the carrier lifetime of the carriers 108 generated in the photocatalyst layer 106, it is difficult to transport the carriers 108 up to the film surface of the photocatalyst layer 106 without deactivating the carriers 108. For this reason, the photocatalyst layer 106 cannot have a film thickness to such an extent that 100% of the light in the absorption wavelength region can be absorbed. In addition, in the photocatalyst electrode 100a in which the substrate 103 and the conductive layer 105 are made transparent, the light $L_{100}$ incident on the photocatalyst layer 106, is partially transmitted through the substrate 103. This is designated by reference sign $L_{10}$.

Figure 3:
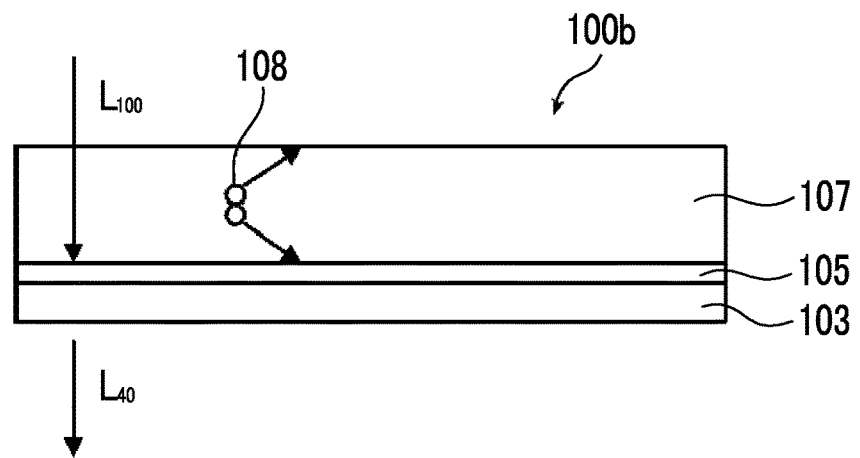
FIG. 3 is a schematic view illustrating a third configuration of the photocatalyst electrode to be utilized for the decomposition of water.

By making a photocatalyst layer 107 thin as in a photocatalyst electrode 100b illustrated in FIG. 3, the deactivation during the movement of the carriers 108 generated in the photocatalyst layer 107 can be suppressed. However, by making the photocatalyst layer 107 thin, the number of photons that can be absorbed decreases. In the photocatalyst electrode 100b, the transmission quantity of the light from the substrate 103, in which the absorption quantity of the light $L_{100}$ incident on the photocatalyst layer 106 is small, is larger than that of the photocatalyst electrode 100a illustrated in FIG. 2. This is designated by reference sign $L_{40}$.

Figure 4:
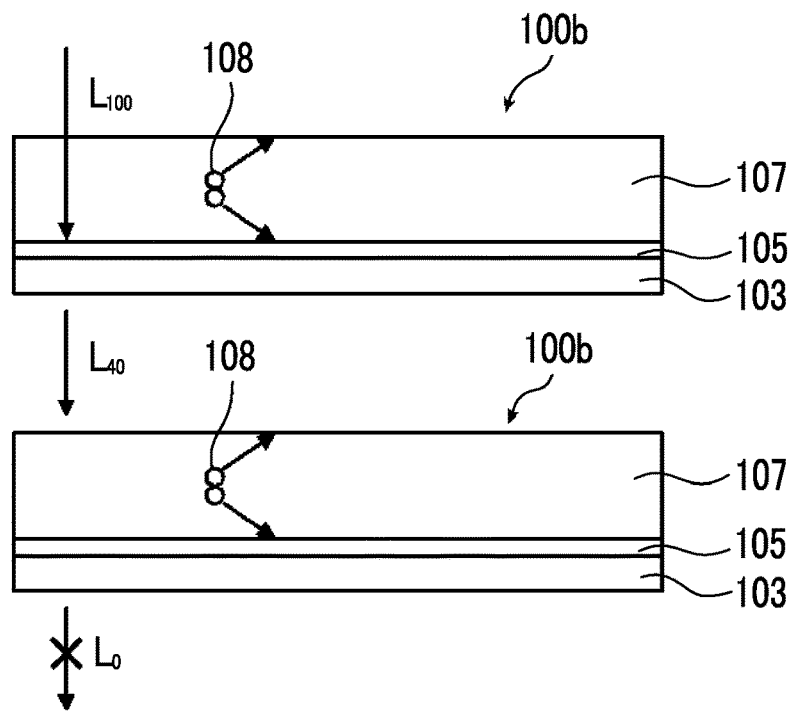
FIG. 4 is a schematic view illustrating a fourth configuration of the photocatalyst electrode to be utilized for the decomposition of water.

Thus, as illustrated in FIG. 4, 100% of the light $L_{100}$ in the absorption wavelength region that has been incident can be absorbed and utilized by using a plurality of (two in FIG. 4) the photocatalyst electrodes 100b each having a thin photocatalyst layer 107, and absorbing and utilizing the light $L_{40}$, which is transmitted without being absorbed in one photocatalyst electrode 100b in the incident light $L_{100}$, in the other photocatalyst electrode 100b. This is applied to the artificial photosynthesis module that decomposes water to generate hydrogen and oxygen.

Next, the artificial photosynthesis module will be described.

Figure 5:
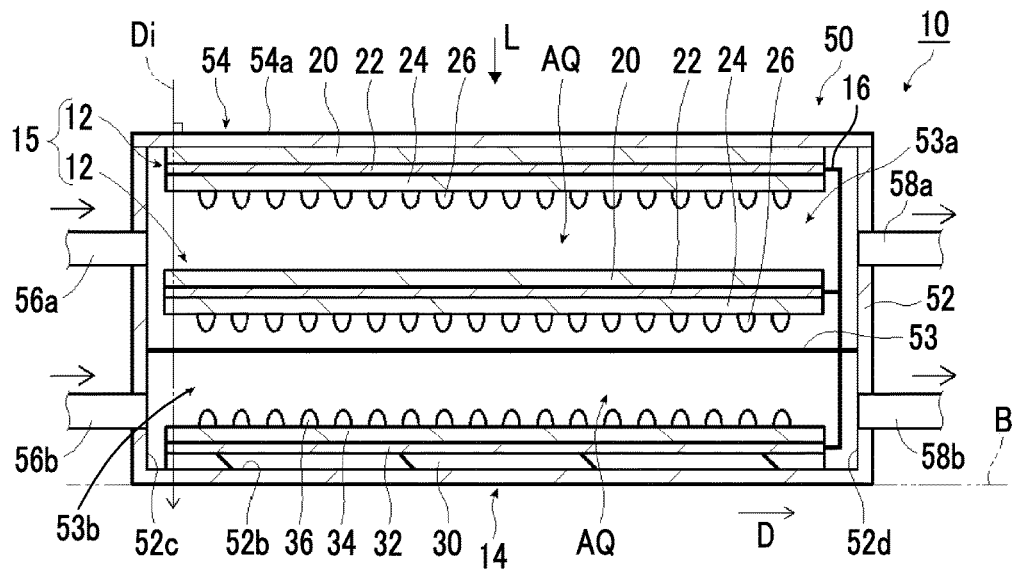
FIG. 5 is a schematic cross-sectional view illustrating a first example of an artificial photosynthesis module of the embodiment of the invention.
Figure 6:
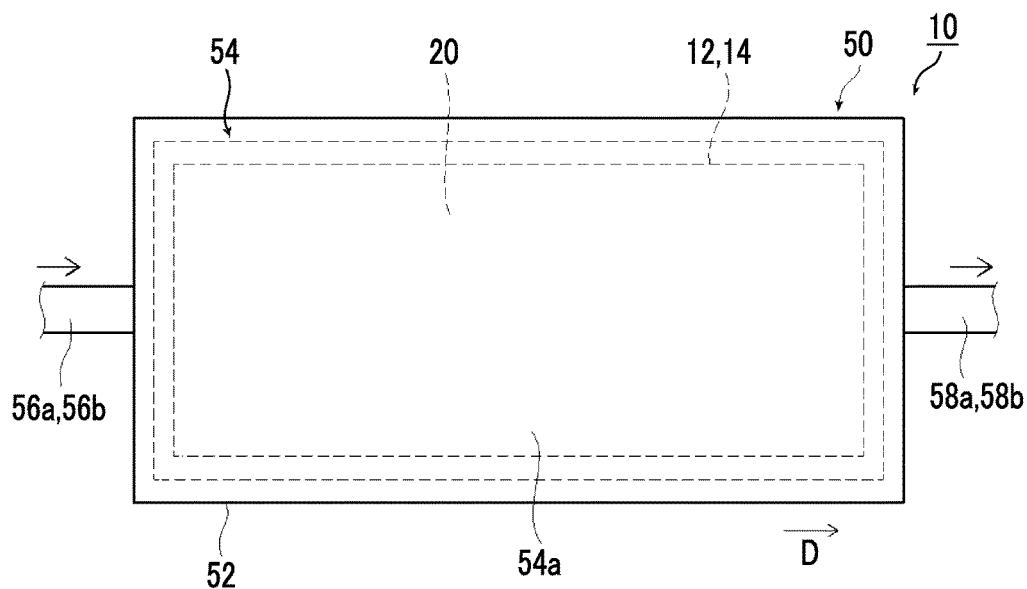
FIG. 6 is a schematic plan view illustrating a first example of an artificial photosynthesis module of the embodiment of the invention.
Figure 7:
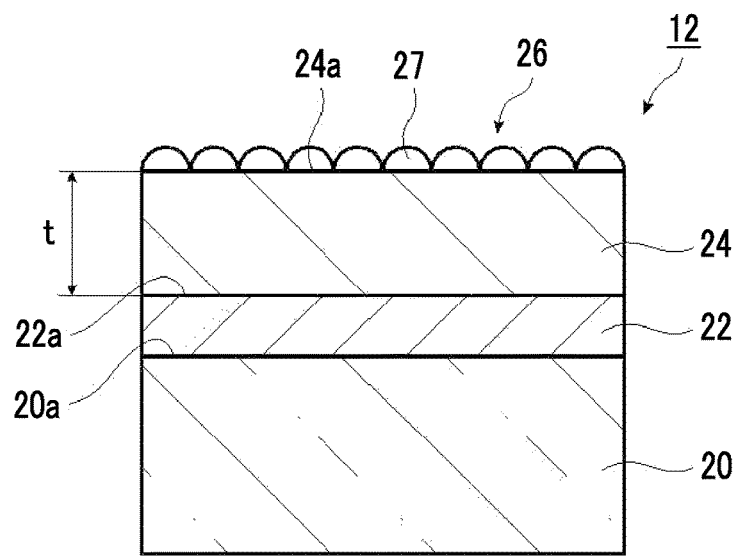
FIG. 7 is a schematic cross-sectional view illustrating an example of an oxygen generation electrode.
Figure 8:
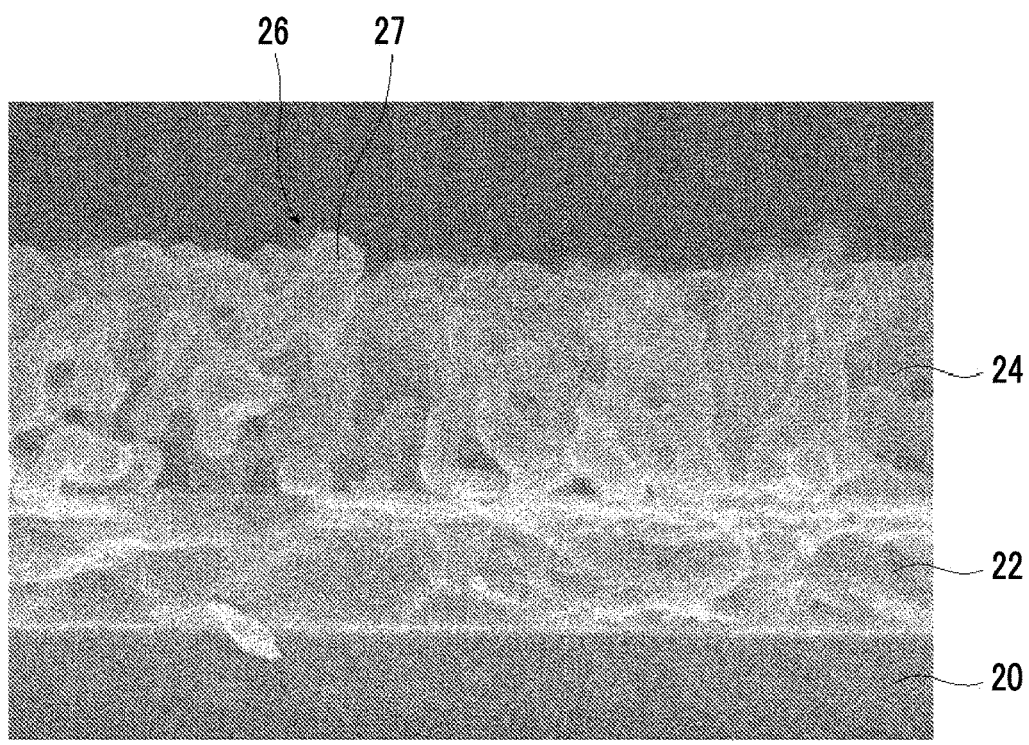
FIG. 8 is an SEM image illustrating a cross section of the oxygen generation electrode.
Figure 9:
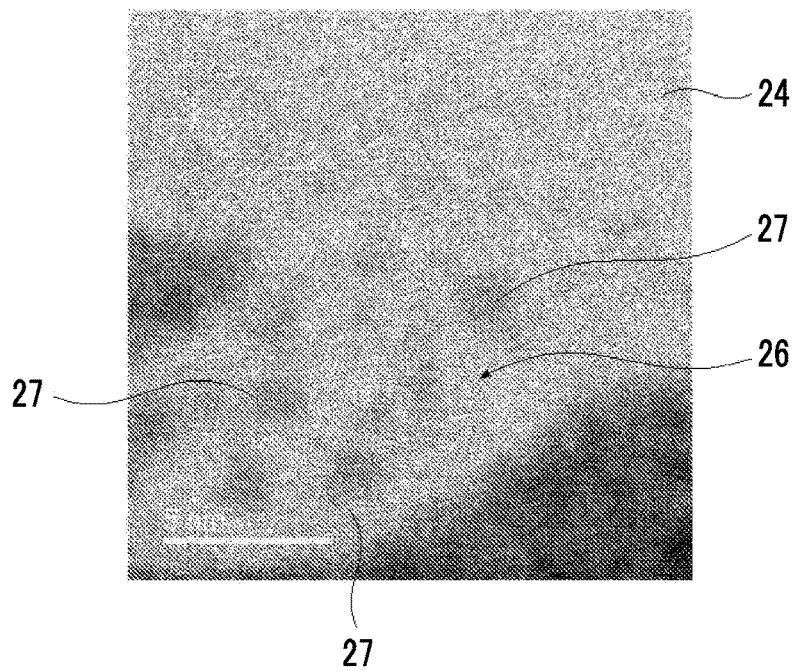
FIG. 9 is a schematic view of the oxygen generation electrode as seen from a first co-catalyst side.
Figure 10:
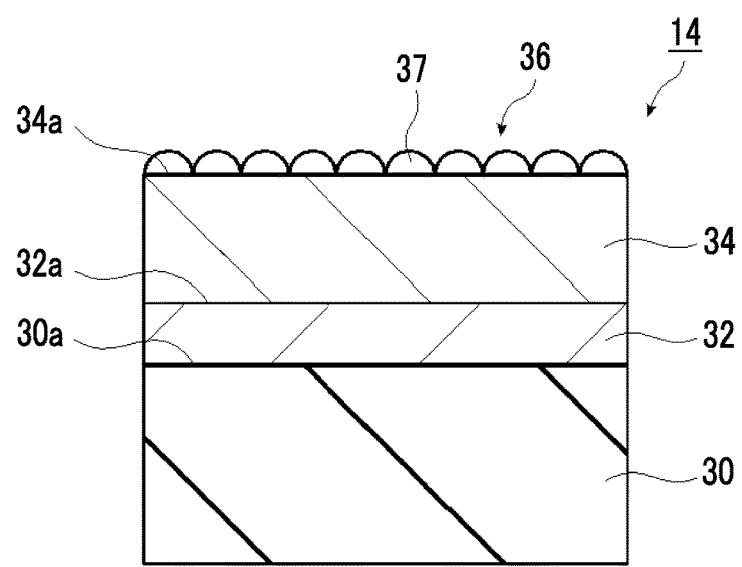
FIG. 10 is a schematic cross-sectional view illustrating an example of a hydrogen generation electrode.

Here, FIG. 5 is a schematic cross-sectional view illustrating a first example of the artificial photosynthesis module of the embodiment of the invention, and FIG. 6 is a schematic plan view illustrating the first example of the artificial photosynthesis module of the embodiment of the invention. FIG. 7 is a schematic cross-sectional view illustrating an example of an oxygen generation electrode, FIG. 8 is a schematic view illustrating a cross section of the oxygen generation electrode, FIG. 9 is a schematic view of the oxygen generation electrode as seen from a first co-catalyst side, and FIG. 10 is a schematic cross-sectional view illustrating an example of a hydrogen generation electrode.

An artificial photosynthesis module 10 illustrated in FIG. 5 is a two-electrode water decomposition module that decomposes water with light L to generate hydrogen and oxygen and has a plurality of oxygen generation electrodes 12 and a hydrogen generation electrode 14. The oxygen generation electrodes 12 and the hydrogen generation electrode 14 are photocatalyst electrodes to be utilized for decomposition of water.

In addition, an electrolytic aqueous solution AQ is also included in the water to be decomposed by the artificial photosynthesis module 10. Here, the electrolytic aqueous solution AQ is a liquid having $H_2O$ as a main component, may be an aqueous solution having water as a solvent and including a solute, and is, for example, an electrolytic solution including strong alkali (KOH (potassium hydroxide)) and $H_2SO_4$, a sodium sulfate electrolytic solution, a potassium phosphate buffer solution, or the like. $H_3BO_3$ adjusted to pH 9.5 is preferable for the electrolytic aqueous solution AQ. The water may be distilled water, or cooling water to be used in a cooling tower or the like.

The artificial photosynthesis module 10 has, for example, two oxygen generation electrodes 12, one hydrogen generation electrode 14, and a container 50 that houses the oxygen generation electrodes 12 and the hydrogen generation electrode 14. For example, the container 50 is disposed on a horizontal plane B.

The oxygen generation electrodes 12 decompose water to generate oxygen, and are flat plate-shaped in their entireties as illustrated in FIG. 6. The hydrogen generation electrode 14 decomposes water to generate hydrogen, and is flat plate-shaped in its entirety as illustrated in FIG. 6.

As illustrated in FIG. 5, the container 50 has a housing 52 of which one face is open, and a transparent member 54 that covers the open portion of the housing 52. The diaphragm 53 is provided within the container 50, a first compartment 53a is formed on the transparent member 54 side, and a second compartment 53b is formed on the bottom surface 52b side. The light L is, for example, solar light and is incident from the transparent member 54 side. It is preferable that the transparent member 54 also satisfy the specifications of the above-described "transparent".

The two oxygen generation electrodes 12 and the hydrogen generation electrode 14 are electrically connected to each other by, for example, a conducting wire 16. The two oxygen generation electrodes 12 and the hydrogen generation electrode 14 are disposed in order of the two oxygen generation electrodes 12 and the hydrogen generation electrode 14 with the diaphragm 53 interposed therebetween within the container 50 in series in a traveling direction Di of the light L. In FIG. 5, the two oxygen generation electrodes 12 and the hydrogen generation electrode 14 are overlappingly disposed parallel to each other with a gap therebetween. In addition, the number of oxygen generation electrodes 12 has only to be two or more and is not limited to two.

The two oxygen generation electrodes 12 are disposed in the first compartment 53a. A first substrate 20 of one oxygen generation electrode 12 is disposed in contact with the transparent member 54, and the other oxygen generation electrode 12 is disposed with a gap.

The hydrogen generation electrode 14 is disposed in the second compartment 53b with a second substrate 30 in contact with the bottom surface 52b.

In addition, the light L is incident from the transparent member 54 side with respect to the container 50, that is, the light L is incident from the oxygen generation electrode 12 side. The above-described traveling direction Di of the light L is a direction perpendicular to a surface 54a of the transparent member 54.

The diaphragm 53 becomes transparent in a case where the diaphragm is wetted in the electrolytic aqueous solution AQ, the hydrogen generation electrode 14 can be irradiated with the light L from the outside, and generated dissolved hydrogen and oxygen are transmitted through the diaphragm, but bubbled hydrogen and oxygen are not transmitted through the diaphragm. For example, a membrane filter, a porous plastic, porous glass, non-woven paper, and the like can be used for the diaphragm 53.

As the diaphragm 53 that becomes transparent in a case where the diaphragm is wetted in the electrolytic aqueous solution AQ, there is a membrane filter made by Merck KGaA. In addition to this, as the diaphragm 53, for example, a proton transportation film is used, specifically, Nafion (registered trademark) is used.

In the first compartment 53a, a first wall surface 52c is provided with a supply pipe 56a, and a second wall surface 52d that faces the first wall surface 52c is provided with a discharge pipe 58a. In the second compartment 53b, the first wall surface 52c is provided with a supply pipe 56b, and the second wall surface 52d that faces the first wall surface 52c is provided with a discharge pipe 58b. The electrolytic aqueous solution AQ is supplied into the container 50 from the supply pipe 56a and the supply pipe 56b, the inside of the container 50 is filled with the electrolytic aqueous solution AQ, the electrolytic aqueous solution AQ flows in the direction D, the electrolytic aqueous solution AQ including oxygen is discharged from the discharge pipe 58a, and the oxygen is recovered. From the discharge pipe 58b, the electrolytic aqueous solution AQ including hydrogen is discharged and the hydrogen is recovered.

The direction D is a direction from the first wall surface 52c toward the second wall surface 52d. In addition, the housing 52 is formed of, for example, electrical insulating materials that do not cause short circuiting or the like in a case where the hydrogen generation electrode 14 and the oxygen generation electrodes 12 are used. The housing 52 is formed of, for example, acrylic resin.

As illustrated in FIGS. 5 and 7, each oxygen generation electrode 12 has the first substrate 20, a first conductive layer 22 provided in the first substrate 20, that is, a surface 20a, a first photocatalyst layer 24 provided on the first conductive layer 22, that is, a surface 22a, and a first co-catalyst 26 that is carried and supported on at least a portion of the first photocatalyst layer 24. The oxygen generation electrode 12 includes the first substrate 20, the first conductive layer 22, the first photocatalyst layer 24, and the first co-catalyst 26.

An absorption end of the first photocatalyst layer 24 is, for example, about 500 to 800 nm. It is preferable that the total thickness of the oxygen generation electrode 12 is about 2 mm.

The oxygen generation electrode 12 is formed such that the first substrate 20 is transparent in order to irradiate the hydrogen generation electrode 14 with the light L. Although the plurality of oxygen generation electrodes 12 are provided, at least one first substrate 20 among the first substrates 20 included in the plurality of oxygen generation electrodes 12 may be transparent, or all the first substrates 20 included in the plurality of oxygen generation electrodes 12 may be transparent.

The term "transparent" in the first substrate 20 means that the light transmittance of the first substrate 20 is 60% or more in a region having a wavelength of 380 to 780 nm. The above-described light transmittance is measured by a spectrophotometer. As the spectrophotometer, for example, V-770 (product name), which is an ultraviolet-visible spectrophotometer manufactured by JASCO Corporation, is used.

In addition, in a case where the transmittance is T %, the transmittance is expressed by T=(Σλ(Measurement substance+Substrate)/Σλ (Substrate))×100%. The above-described measurement substance is a glass substrate, and a substrate reference is air. The range of integration is up to a light-receiving wavelength of a photocatalyst layer, in light having a wavelength of 380 to 780 nm. In addition, JIS R 3106-1998 can be referred to for the measurement of the transmittance.

The first co-catalyst 26 is constituted of, for example, a plurality of co-catalyst particles 27. Accordingly, a decrease in the quantity of the light L incident on a surface 24a of the first photocatalyst layer 24 is suppressed.

In each oxygen generation electrode 12, it is required that the first co-catalyst 26 is in contact with the first photocatalyst layer 24 or is in contact with the electrolytic aqueous solution AQ with a layer allowing holes to move therethrough interposed therebetween.

In the oxygen generation electrode 12, more specifically, as in a cross-sectional scanning electron microscope (SEM) image illustrated in FIG. 8, the co-catalyst particles 27 are carried and supported as the first co-catalyst 26 on a portion of the first photocatalyst layer 24. Also as seen from the first photocatalyst layer 24 side, it can be seen that the co-catalyst particles 27 are carried and supported as the first co-catalyst 26 on a portion of the first photocatalyst layer 24 as in a transmission electron microscope (TEM) image illustrated in FIG. 9.

In addition, in FIGS. 8 and 9, the same components as those of an oxygen generation electrode 12 illustrated in FIG. 7 are designated by the same reference signs.

The oxygen generation electrode 12 allows the light L to be transmitted therethrough in order to make the light L incident on the hydrogen generation electrode 14. In order to irradiate the hydrogen generation electrode 14 with the light L, the light L needs to be transmitted through the two oxygen generation electrodes 12. For this reason, the first substrates 20 are transparent as described above.

Individual components of the oxygen generation electrodes 12 will be described below in detail. The plurality of oxygen generation electrodes 12 are also collectively referred to as an oxygen generation electrode group 15.

As illustrated in FIG. 5, the light L is incident from the oxygen generation electrode 12 side. However, the first co-catalyst 26 of the oxygen generation electrode 12 on the transparent member 54 side on which the light L is incident first out of the two oxygen generation electrodes 12 is provided on a side opposite to an incidence side of the light L. In FIG. 5, the first co-catalysts 26 of both the two oxygen generation electrodes 12 are provided on the side opposite to the incidence side of the light L.

A second co-catalyst 36 of the hydrogen generation electrode 14 is provided on the incidence side of the light L.

As illustrated in FIGS. 5 and 10, the hydrogen generation electrodes 14 have the second substrate 30, a second conductive layer 32 provided in the second substrate 30, that is, a surface 30a, a second photocatalyst layer 34 provided on the second conductive layer 32, that is, a surface 32a, and a second co-catalyst 36 that is carried and supported on at least a portion of the second photocatalyst layer 34. The hydrogen generation electrode 14 includes the second substrate 30, the second conductive layer 32, the second photocatalyst layer 34, and the second co-catalyst 36.

An absorption end of the second photocatalyst layer 34 is, for example, about 600 to 1300 nm.

The second co-catalyst 36 is provided on a surface 34a of the second photocatalyst layer 34. The second co-catalyst 36 is constituted of, for example, a plurality of co-catalyst particles 37. Accordingly, a decrease in the quantity of the light L incident on the surface 34a of the second photocatalyst layer 34 is suppressed. In the hydrogen generation electrode 14, the carriers generated in a case where the light L is absorbed are generated, and water is decomposed to generate hydrogen.

In the hydrogen generation electrode 14, as will be described below, it is also preferable to laminate a material having n-type conductivity on the surface 34a of the second photocatalyst layer 34 to form a pn junction. Individual components of the hydrogen generation electrode 14 will be described below in detail.

In the artificial photosynthesis module 10 illustrated in FIG. 5, by supplying the electrolytic aqueous solution AQ into the first compartment 53a of the container 50 via the supply pipe 56a, supplying the electrolytic aqueous solution AQ into the second compartment 53b of the container 50 via the supply pipe 56b, and making the light L incident from the transparent member 54 side, oxygen is generated in the first co-catalyst 26 from the two oxygen generation electrodes 12, respectively, and hydrogen is generated in the second co-catalyst 36 from the hydrogen generation electrode 14 due to the light transmitted through the two oxygen generation electrodes 12. Then, the electrolytic aqueous solution AQ including the oxygen is discharged from the discharge pipe 58a, and the oxygen is recovered from the electrolytic aqueous solution AQ including the discharged oxygen. Then, the electrolytic aqueous solution AQ including the hydrogen is discharged from the discharge pipe 58b, and the hydrogen is recovered from the electrolytic aqueous solution AQ including the discharged hydrogen.

In the two-electrode water decomposition module having the hydrogen generation electrode and the oxygen generation electrode 10, that is, the artificial photosynthesis module, it can be seen that the performance of the oxygen generation electrodes 12 is rate-limiting for the water decomposition efficiency.

The water decomposition of the artificial photosynthesis module 10 is performed in a location where the decomposition efficiencies of the hydrogen generation electrode 14 and the oxygen generation electrodes 12 are balanced with each other.

That is, an increase in the decomposition efficiency on a side where the performance is inferior, that is, on the oxygen generation electrode 12 side leads to an improvement in the performance of the artificial photosynthesis module 10.

Here, the decomposition efficiency on the oxygen generation electrode 12 side is an oxygen generation amount or the current density of oxygen generation. A relationship between the oxygen generation amount and the current density of the oxygen generation electrode is Current density=Number of electrons, and 1 mol of oxygen is generated in the movement of 4 mol of electrons.

In the oxygen generation electrodes 12, the carriers generated in a case where the light L is absorbed decompose water to generate oxygen. In order to increase the efficiency on the oxygen generation electrode 12 side, it is necessary to increase the number of carriers generated due to the incidence of light. The carriers are, for example, holes.

As a result of inventor's studies, as illustrated in above-described in FIG. 3, it can be seen that the oxygen generation electrodes 12 side cannot absorb all light in an absorbable wavelength range. This is evaluated to be a problem that the film thickness is excessively small with respect to the absorption coefficient of the first photocatalyst layer 24. Additionally, as illustrated in the above-described FIG. 1, it can also be seen that an increase in current density equivalent to an increase in thickness, that is, the water decomposition efficiency is not obtained due to the mobility and the lifetime of the carriers even in a case where the first photocatalyst layer 24 is sufficiently thick on one side.

Meanwhile, in order to enhance the capability on the oxygen generation electrode side during studies up to now, it is studied that the area of the oxygen generation electrodes is increased with respect to the hydrogen generation electrode. However, in a case where only the area of the oxygen generation electrodes is increased, the total efficiency of oxygen and hydrogen expressed by Gas generation amount/ Electrode area tends to decrease.

By disposing the oxygen generation electrodes and the hydrogen generation electrode in series in the traveling direction Di of the light L, in the oxygen generation electrodes, the first photocatalyst layer 24 can be formed on the first conductive layer 22. Even in a case where the light L having a specific wavelength is utilized for generation of oxygen in the oxygen generation electrodes in a case where an absorption end of a hydrogen generation catalyst is wide, a required carrier generation amount is obtained in the hydrogen generation electrode.

Since the light L is incident from a back surface through the first substrate 20 by providing the first co-catalysts 26 of the oxygen generation electrodes 12 on the side opposite to the incidence side of the light L, a damping effect of the first co-catalyst 26 can be suppressed.

In the artificial photosynthesis module 10, the two oxygen generation electrodes 12 and the hydrogen generation electrode 14 are disposed in series in the traveling direction Di of the light L, and water is decomposed to generate oxygen in the oxygen generation electrode 12 on which the light L is first incident. The light L, which is transmitted through the oxygen generation electrode 12 on which the light L is first incident, in the incident light L, is utilized for generation of oxygen in the other oxygen generation electrode 12, water is decomposed to generate oxygen. In this way, by utilizing the light L, which is transmitted through the one oxygen generation electrode 12, in the other oxygen generation electrode 12, the utilization efficiency of the light L in the two oxygen generation electrodes 12 can be made high, and the carrier generation amount in the two oxygen generation electrodes 12 can be increased. Accordingly, the current density showing the water decomposition in the two oxygen generation electrodes 12 can be made high.

Meanwhile, in the hydrogen generation electrode 14, the light L transmitted through the two oxygen generation electrodes 12 is radiated, and the water included in the electrolytic aqueous solution AQ is decomposed to generate hydrogen. In the artificial photosynthesis module 10, oxygen and hydrogen can be obtained in this way. Moreover, in the artificial photosynthesis module 10, by utilizing the light L in the two oxygen generation electrodes 12 and the hydrogen generation electrodes 14, the utilization efficiency of the light L can be made high and the reaction efficiency is high. That is, the current density showing the water decomposition can be made high.

In the artificial photosynthesis module 10, as described above, the reaction efficiency of the light L in the two oxygen generation electrodes 12 can be made high, and the utilization efficiency can be made high without increasing the installation area of the oxygen generation electrodes 12 and the hydrogen generation electrode 14.

Additionally, in a case where the absorption end of the first photocatalyst layer 24 of each oxygen generation electrode 12 is about 500 to 800 nm, light having a wavelength on a wavelength side shorter than that of the absorption end of the light L is mainly utilized on the oxygen generation side. Therefore, in a case where sulfide semiconductors, such as CdS and ZnS, are used for the configuration of the hydrogen generation electrode 14, the photolysis of the sulfide semiconductors is suppressed. For this reason, the durability of the artificial photosynthesis module 10 can be improved.

In the artificial photosynthesis module 10, in a case where the absorption end of the first photocatalyst layer 24 of the oxygen generation electrode 12 is defined as $\lambda_1$ and the absorption end of the second photocatalyst layer 34 of the hydrogen generation electrode 14 is defined as $\lambda_2$, it is preferable that $\lambda_1 < \lambda_2$ and $\lambda_2 - \lambda_1 \geq 100$ nm are satisfied. Accordingly, in a case where the light L is solar light, even in a case where light having a specific wavelength is previously absorbed by the first photocatalyst layer 24 of the oxygen generation electrode 12 and is utilized for generation of oxygen, the light L can be absorbed by the second photocatalyst layer 34 (refer to FIG. 6) of the hydrogen generation electrode 14 and can be utilized for generation of hydrogen. Accordingly, the utilization efficiency of the light L can be further enhanced.

The absorption end $\lambda_1$ of the first photocatalyst layer 24 of the oxygen generation electrode 12 is preferably 500 nm or more, more preferably 600 nm or more, and even more preferably 700 nm or more.

The absorption end $\lambda_2$ of the second photocatalyst layer 34 of the hydrogen generation electrode 14 is preferably as long as possible, preferably 900 nm, more preferably 1100 nm or more, and even more preferably 1300 nm or more.

An upper limit value of $\lambda_2 - \lambda_1$ is, for example, 700 nm. In this case, a preferable range between a difference $\lambda_2 - \lambda_1$ of the absorption end is 100 nm or more and 700 nm or less. That is, 100 nm$\leq \lambda_2 - \lambda_1 \leq$700 nm is satisfied.

Here, the absorption end is a portion or its end where an absorbance decreases abruptly in a case where the wavelength becomes longer than this in a continuous absorption spectrum, and the unit of the absorption end is nm.

In addition, in a case where the one hydrogen generation electrode 14 and the two oxygen generation electrodes 12 are electrically connected to each other, a connection form is not particularly limited and is not limited to the conducting wire 16. Additionally, the one hydrogen generation electrode 14 and the two oxygen generation electrodes 12 may be electrically connected to each other, and a connection method is not particularly limited.

Figure 11:
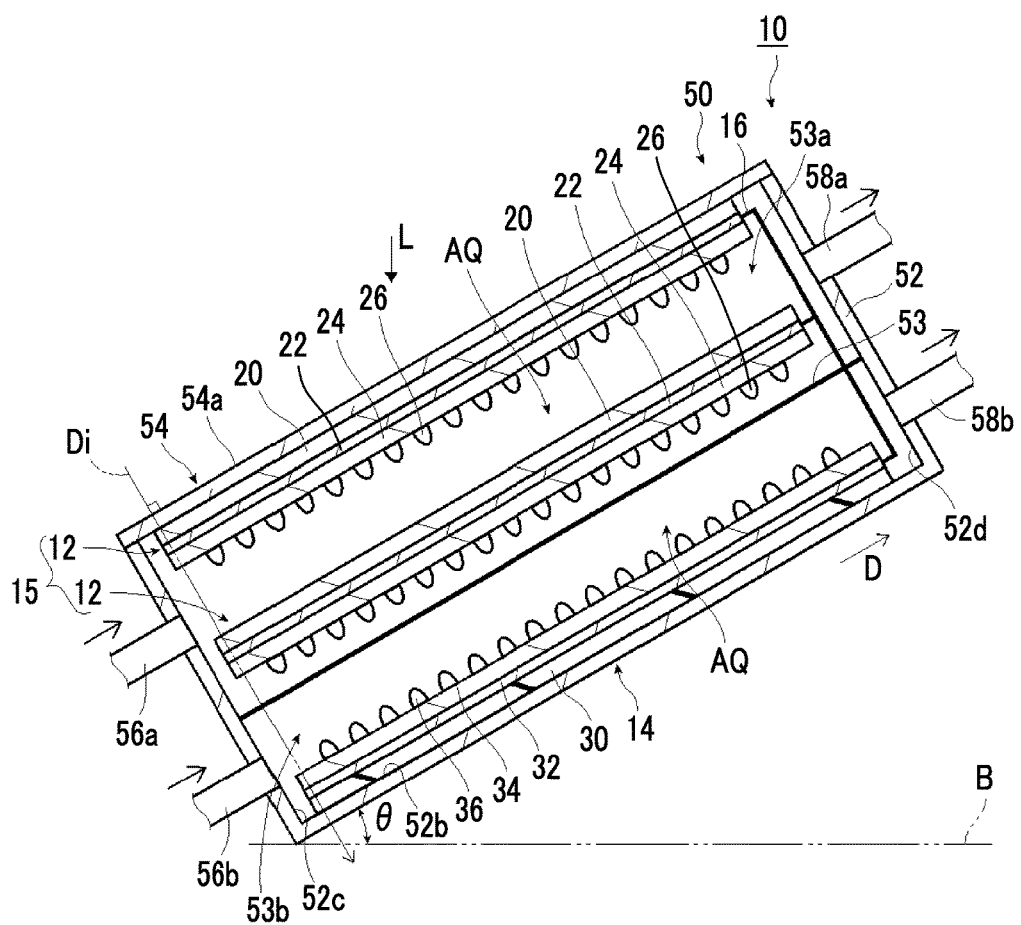
FIG. 11 is a schematic cross-sectional view illustrating a second example of the artificial photosynthesis module of the embodiment of the invention.

Additionally, in the artificial photosynthesis module 10, the container 50 is disposed on the horizontal plane B in FIG. 5, but may be disposed to tilt at a predetermined angle θ with respect to the horizontal plane B as illustrated in FIG. 11. In this case, as compared to the supply pipe 56a and the supply pipe 56b, the discharge pipe 58a and the discharge pipe 58b become high, and the generated oxygen and hydrogen is easily recovered. Additionally, the generated oxygen can be rapidly moved from the oxygen generation electrodes 12, and the generated hydrogen can be rapidly moved from the hydrogen generation electrode 14. Accordingly, stagnation of the generated oxygen and hydrogen in the form of air bubbles is suppressed, and blocking of the light L by the air bubbles is suppressed. For this reason, the influence on the reaction efficiency of the generated oxygen and hydrogen can be reduced.

As illustrated in FIG. 11, in a case where the artificial photosynthesis module 10 is tilted at the angle θ with respect to the horizontal plane B, the light L is not incident perpendicularly to the surface 54a of the transparent member 54. However, in each oxygen generation electrode 12, the first co-catalyst 26 is provided on the side opposite to the incidence side of the light L and the first substrate 20. Also in the artificial photosynthesis module 10 tilted at the angle θ illustrated in FIG. 11, the traveling direction Di of the light L is made the same as that in FIG. 1.

Figure 12:
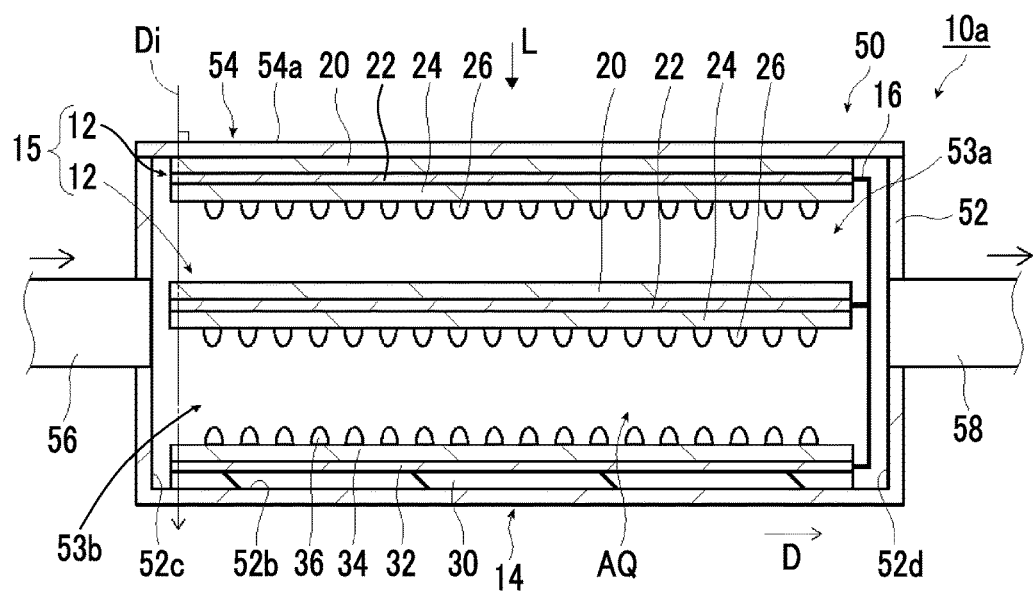
FIG. 12 is a schematic cross-sectional view illustrating a third example of the artificial photosynthesis module of the embodiment of the invention.

Additionally, as in an artificial photosynthesis module 10a illustrated in FIG. 12, a configuration having no diaphragm 53 may be adopted. In addition, in the artificial photosynthesis module 10a illustrated in FIG. 12, the same components as those of the artificial photosynthesis module 10 illustrated in FIG. 5 will be designated by the same reference signs, and the detailed description thereof will be omitted.

In the artificial photosynthesis module 10a, the inside of the container 50 is not partitioned, the first wall surface 52c of the housing 52 is provided with a supply pipe 56, and the second wall surface 52d that faces the first wall surface 52c is provided with a discharge pipe 58. The electrolytic aqueous solution AQ is supplied into the container 50 from the supply pipe 56, the inside of the container 50 is filled with the electrolytic aqueous solution AQ, the electrolytic aqueous solution AQ flows in the direction D, and the electrolytic aqueous solution AQ is discharged from the discharge pipe 58.

In the artificial photosynthesis module 10a, by supplying the electrolytic aqueous solution AQ into the container 50 via the supply pipe 56 and making the light L incident from the transparent member 54 side, oxygen is generated from the oxygen generation electrodes 12, and hydrogen is generated from the hydrogen generation electrode 14. Then, the electrolytic aqueous solution AQ including the hydrogen and the oxygen is discharged from the discharge pipe 58, and the hydrogen and the oxygen are recovered from the electrolytic aqueous solution AQ including the discharged hydrogen and oxygen.

In addition, in the artificial photosynthesis module 10a, the same effects as those of the artificial photosynthesis module 10 illustrated in FIG. 5 can be obtained.

Additionally, as illustrated in FIG. 11, the artificial photosynthesis module 10a may also be disposed to tilt at the predetermined angle θ with respect to the horizontal plane B.

The arrangement of the oxygen generation electrodes 12 in the oxygen generation electrode group 15 is not particularly limited so long as the oxygen generation electrode 12 on which the light L is first incident as described above has the first co-catalyst 26 on the side of the first substrate 20 opposite to the incidence side of the light L.

FIGS. 13 to 16 are schematic cross-sectional views illustrating first to fourth examples of the arrangement of oxygen generation electrodes. In FIGS. 13 to 16, the same components as those of the artificial photosynthesis module 10 illustrated in FIG. 5 will be designated by the same reference signs, and the detailed description thereof will be omitted.

Figure 13:
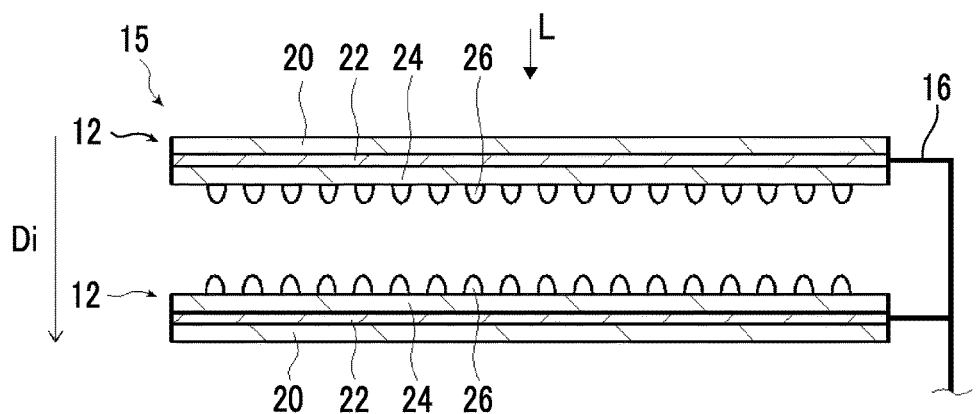
FIG. 13 is a schematic cross-sectional view illustrating a first example of the arrangement of oxygen generation electrodes.

As illustrated in FIG. 13, in the oxygen generation electrode group 15 in which the two oxygen generation electrodes 12 are disposed in the traveling direction Di of the above-described light L, the two oxygen generation electrodes 12 are disposed to face the first co-catalysts 26.

Figure 14:
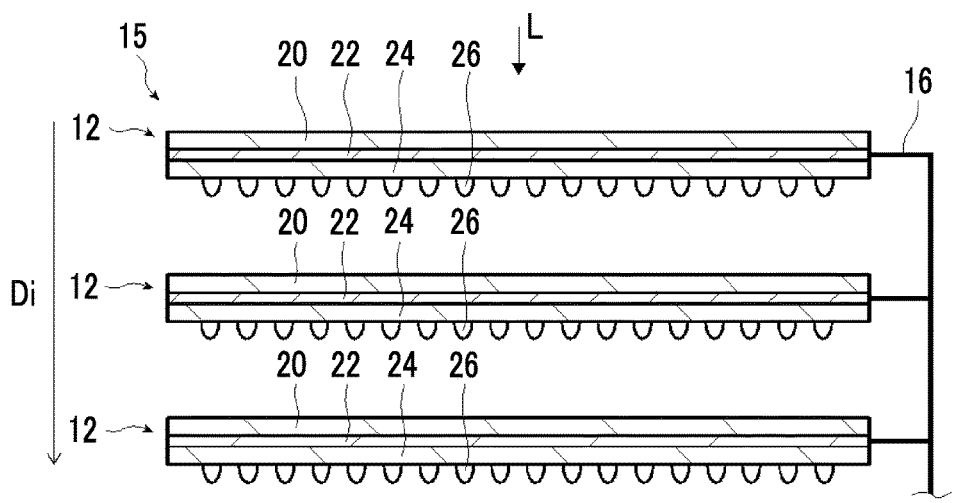
FIG. 14 is a schematic cross-sectional view illustrating a second example of the arrangement of oxygen generation electrodes.
Figure 15:
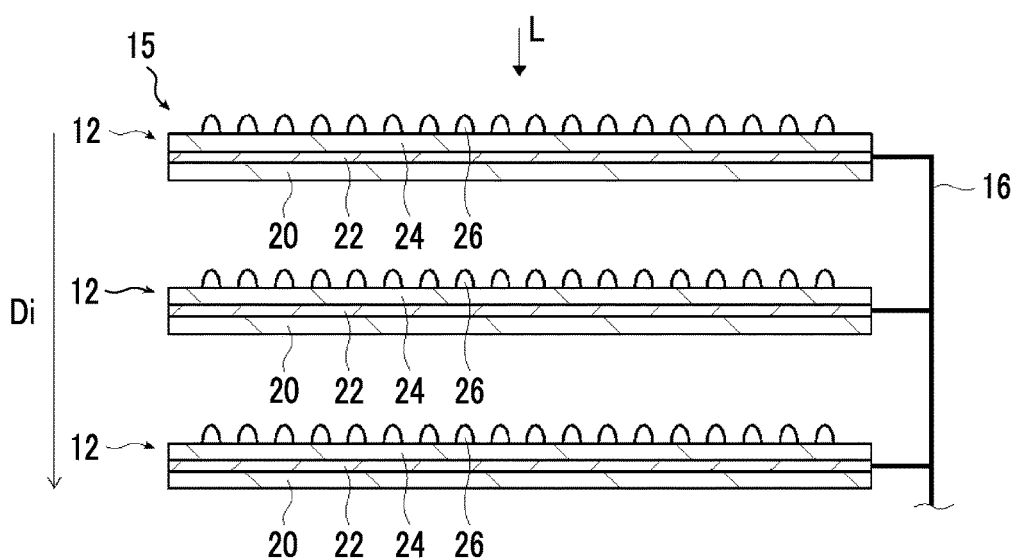
FIG. 15 is a schematic cross-sectional view illustrating a third example of the arrangement of oxygen generation electrodes.
Figure 16:
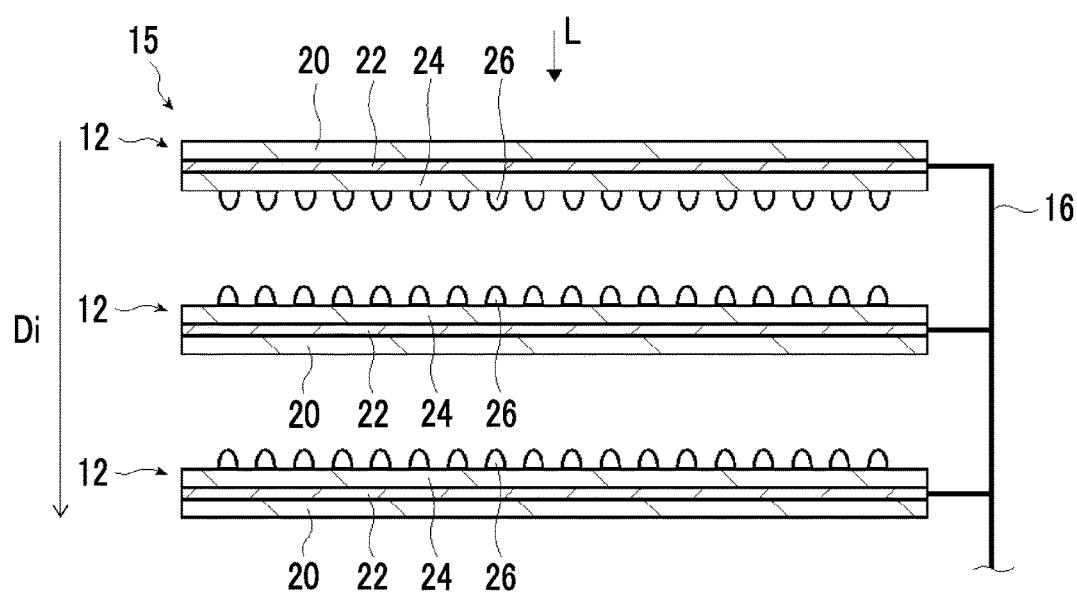
FIG. 16 is a schematic cross-sectional view illustrating a fourth example of the arrangement of oxygen generation electrodes.

Additionally, the number of the oxygen generation electrodes 12 in the oxygen generation electrode group 15 is not limited to two, and may be three oxygen generation electrodes 12 as illustrated in FIG. 14. In FIG. 14, in the oxygen generation electrodes 12 of the oxygen generation electrode group 15, the first co-catalyst 26 is provided on the side opposite to the incidence side of the light L. However, as illustrated in FIG. 15, in all the oxygen generation electrodes 12 of the oxygen generation electrode group 15, a configuration in which the first co-catalyst 26 is provided on the incidence side of the light L may be adopted. Even in this case, as illustrated in FIG. 16, in the oxygen generation electrode group 15, in the oxygen generation electrode 12 on which the light L is first incident, it is preferable that the first co-catalyst 26 is provided on the side opposite to the incidence side. In the other oxygen generation electrodes 12, a configuration in which the first co-catalyst 26 is provided on the incidence side of the light L may be adopted. In this way, the arrangement of the first co-catalysts 26 of the other oxygen generation electrodes 12 is not particularly limited.

In addition, also in the arrangement of the oxygen generation electrodes 12 illustrated in FIG. 15 or the arrangement of the oxygen generation electrodes 12 illustrated in FIG. 16, it is preferable that the first substrates 20 of all the oxygen generation electrodes 12 of the oxygen generation electrode group 15 are transparent.

Figure 17:
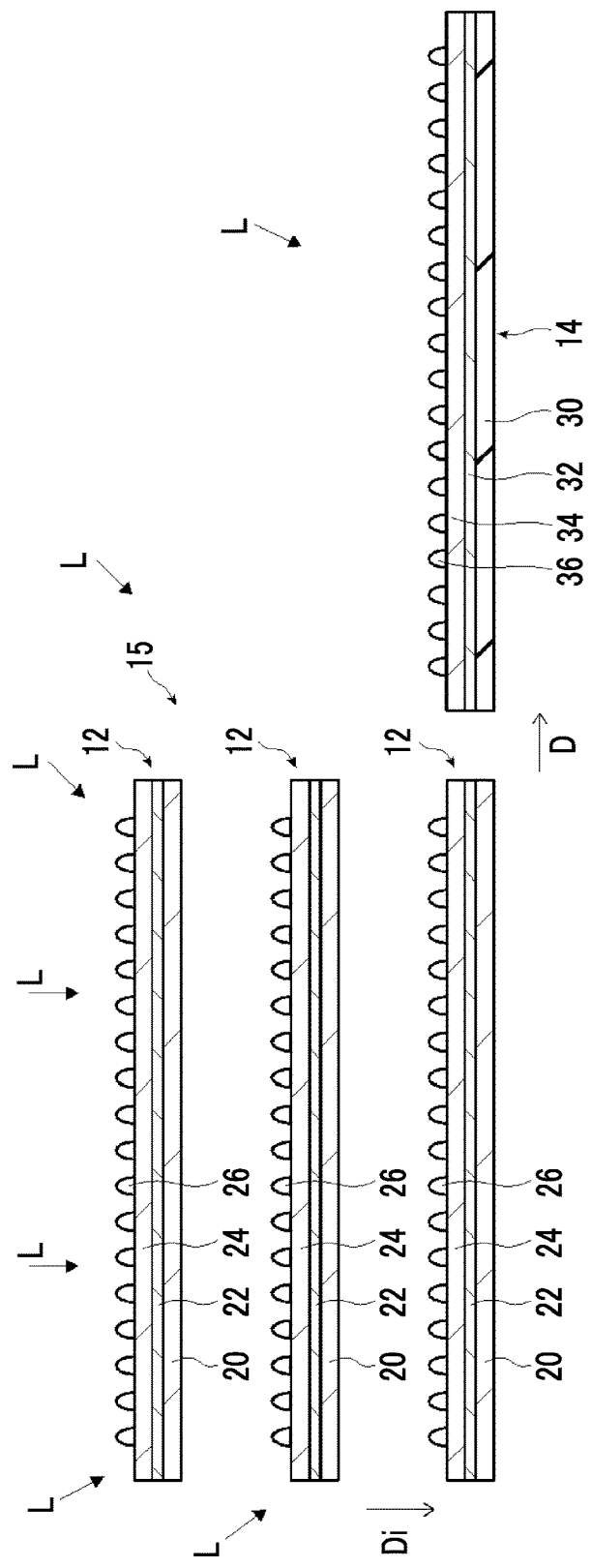
FIG. 17 is a schematic cross-sectional view illustrating an arrangement configuration example of oxygen generation electrodes and a hydrogen generation electrode.

The oxygen generation electrodes 12 and the hydrogen generation electrode 14 may have an arrangement configuration illustrated in FIG. 17. FIG. 17 is a schematic cross-sectional view illustrating an arrangement configuration example of oxygen generation electrodes and a hydrogen generation electrode. In addition, in FIG. 17, the same components as those of the artificial photosynthesis module 10 illustrated in FIG. 5 will be designated by the same reference signs, and the detailed description thereof will be omitted. Illustration of a conducting line 16 is omitted in FIG. 17.

As illustrated in FIG. 17, three oxygen generation electrodes 12 may be disposed in series in the traveling direction Di of the light L, and a third oxygen generation electrode 12 from the incidence side of the light L and the hydrogen generation electrodes 14 may be disposed in juxtaposition with each other in the direction D. In this case, in order for the light L to strike the hydrogen generation electrode 14, for example, it is preferable that the first substrate 20 of a second oxygen generation electrode 12 from the incidence side of the light L is transparent, and the first substrate 20 of the third oxygen generation electrode 12 may be transparent or may not be transparent.

In addition, the number of oxygen generation electrodes 12 is preferably two or more and five or less and more preferably two or more and three or less in a case where the radiation quantity of the light L to the hydrogen generation electrode 14 is taken into consideration.

Additionally, although the artificial photosynthesis module 10 has a configuration having the plurality of oxygen generation electrodes 12, the layer configurations, layer materials, layer thicknesses, and the like of the plurality of individual oxygen generation electrodes 12, are not limited. All the individual oxygen generation electrodes 12 may be the same, or the layer configurations, layer materials, layer thicknesses, and the like of the individual oxygen generation electrodes 12 may be different from each other, respectively.

Hereinafter, the oxygen generation electrodes 12 and the hydrogen generation electrode 14 will be described. First, the first conductive layer 22, the first photocatalyst layer 24, and the first co-catalyst 26 of each oxygen generation electrode 12 will be described.

<First Conductive Layer>

The first conductive layer 22 supports the photocatalyst layers and a coating layer. As the conductive layer, a well-known conductive layer may be used. For example, it is preferable to use a conductive layer formed of metals, nonmetals, such as carbon (graphite), or conductive materials, such as conductive oxides. Among these, it is preferable to use the first conductive layer 22 that is formed of transparent conductive oxides. The term "transparent" in the first conductive layer 22 is the same as the "transparent" in the above-described first substrate 20.

It is preferable that, for example, $SnO_2$, an indium tin oxide (ITO), a fluorine-doped tin oxide (FTO), IMO ($In_2O_3$ doped with Mo), or ZnO doped with Al, B, Ga, In, or the like is used for the above-described transparent conductive oxide.

<First Photocatalyst Layer>

As the optical semiconductor constituting the first photocatalyst layer 24, well-known photocatalysts may be used, and an optical semiconductor containing at least one kind of metallic element is used.

Among these, from a viewpoint of more excellent onset potential, higher photocurrent density, or more excellent durability against continuation irradiation, as metallic elements, Ti, V, Nb, Ta, W, Mo, Zr, Ga, In, Zn, Cu, Ag, Cd, Cr, or Sn is preferable, and Ti, V, Nb, Ta, or W is more preferable.

Additionally, optical semiconductors include oxides, nitrides, oxynitrides, sulfides, selenides, and the like, which include the above metallic elements.

Additionally, the optical semiconductor is usually included as a main component in the second photocatalyst layers. The main component means that the optical semiconductor is equal to or more than 80% by mass with respect to the total mass of the second photocatalyst layer, and preferably equal to or more than 90% by mass. Although an upper limit of the main component is not particularly limited, the upper limit is 100% by mass.

Specific examples of the optical semiconductors may include, for example, oxides, such as $Bi_2WO_6$, $BiVO_4$, $BiYWO_6$, $In_2O_3(ZnO)_3$, $InTaO_4$, and $InTaO_4$:Ni ("optical semiconductor: M" shows that the optical semiconductors are doped with M. The same applies below), $TiO_2$:Ni, $TiO_2$:Ru, $TiO_2$Rh, and $TiO_2$:Ni/Ta ("optical semiconductor: M1/M2" shows that the optical semiconductors are doped with M1 and M2. The same applies below), $TiO_2$:Ni/Nb, $TiO_2$:Cr/Sb, $TiO_2$:Ni/Sb, $TiO_2$:Sb/Cu, $TiO_2$:Rh/Sb, $TiO_2$:Rh/Ta, $TiO_2$:Rh/Nb, $SrTiO_3$:Ni/Ta, $SrTiO_3$:Ni/Nb, $SrTiO_3$:Cr, $SrTiO_3$:Cr/Sb, $SrTiO_3$:Cr/Ta, $SrTiO_3$:Cr/Nb, $SrTiO_3$:Cr/W, $SrTiO_3$:Mn, $SrTiO_3$:Ru, $SrTiO_3$:Rh, $SrTiO_3$:Rh/Sb, $SrTiO_3$:Ir, $CaTiO_3$:Rh, $La_2Ti_2O_7$:Cr, $La_2Ti_2O_7$:Cr/Sb, $La_2Ti_2O_7$:Fe, $PbMoO_4$:Cr, $RbPb_2Nb_3O_{10}$, $HPb_2Nb_3O_{10}$, $PbBi_2Nb_2O_9$, $BiVO_4$, $BiCu_2VO_6$, $BiSn_2VO_6$, $SnNb_2O_6$, $AgNbO_3$, $AgVO_3$, $AgLi_{1/3}Ti_{2/3}O_2$, $AgLi_{1/3}Sn_{2/3}O_2$, $WO_3$, $BaBi_{1-x}In_xO_3$, $BaZr_{1-x}Sn_xO_3$, $BaZr_{1-x}Ge_xO_3$, and $BaZr_{1-x}Si_xO_3$, oxynitrides, such as $LaTiO_2N$, $Ca_{0.25}La_{0.75}TiO_{2.25}N_{0.75}$, TaON, $CaNbO_2N$, $BaNbO_2N$, $CaTaO_2N$, $SrTaO_2N$, $BaTaO_2N$, $LaTaO_2N$, $Y_2Ta_2O_5N_2$, $(Ga_{1-x}Zn_x)(N_{1-x}O_x)$, $(Zn_{1+x}Ge)(N_2O_x)$ (x represents a numerical value of 0 to 1), and $TiN_xO_yF_z$, nitrides, such as NbN and $Ta_3N_5$, sulfides, such as CdS, selenide, such as CdSe, oxysulfide compounds Chemistry Letters, 2007, 36, 854 to 855) including $Ln_2Ti_2S_2O_5$ (Ln: Pr, Nd, Sm, Gd, Tb, Dy, Ho, and Er), La, and In, the optical semiconductors are not limited to the materials exemplified here.

Among these, as the optical semiconductors, $BaBi_{1-x}In_xO_3$, $BaZr_{1-x}Sn_xO_3$, $BaZr_{1-x}Ge_xO_3$, $BaZr_{1-x}Si_xO_3$, NbN, $TiO_2$, $WO_3$, TaON, $BiVO_4$, or $Ta_3N_5$, $AB(O, N)_3$ {A=Li, Na, K, Rb, Cs, Mg, Ca, Sr, Ba, La, or Y, B=Ta, Nb, Sc, Y, La, or Ti} having a perovskite structure; solid solutions including $AB(O, N)_3$ having the above-described perovskite structure as a main component; or doped bodies including TaON, $BiVO_4$, $Ta_3N_5$, or $AB(O, N)_3$ having the perovskite structure as a main component are preferable.

The shape of the second optical semiconductor included in the second photocatalyst layer is not particularly limited, and include a film shape, a columnar shape, a particle shape, and the like.

In a case where the optical semiconductor is particle-shaped, the particle diameter of primary particles thereof is not particularly limited. However, usually, the particle diameter is preferably 0.01 μm or more, and more preferably, 0.1 μm or more, and usually, the particle diameter is preferably 10 μm or less preferably 2 μm or less.

The above-described particle diameter is an average particle diameter, and is obtained by measuring the particle diameters (diameters) of 100 certain optical semiconductors observed by a transmission electron microscope (TEM) or a scanning electron microscope (SEM) and arithmetically averaging these particle diameters. In addition, major diameters are measured in a case where the particle shape is not a true circle.

In a case where the optical semiconductor is columnar, it is preferable that the columnar optical semiconductors extend in a normal direction of surfaces of the conductive layer. Although the diameter of the columnar optical semiconductor is particularly limited, usually, the diameter is preferably 0.025 μnm or more, and more preferably, 0.05 μm or more, and usually, the diameter is preferably 10 μm or less and preferably 2 μm or less.

The above-described diameter is an average diameter and is obtained by measuring the diameters of 100 certain columnar optical semiconductors observed by TEM (Device name: H-8100 of Hitachi High Technologies Corporation) or SEM (Device name: SU-8020 type SEM of Hitachi High Technologies Corporation) and arithmetically averaging the diameters.

Although the thickness of the first photocatalyst layer 24 is not limited, in the case of an oxide or a nitride, it is preferable that the thickness is 300 nm or more and 2 μm or less. In addition, the optimal thickness of the first photocatalyst layer 24 is determined depending on the penetration length of the light L or the diffusion length of excited carriers.

Here, in many materials of the first photocatalyst layer 24 including $BiVO_4$ used well as a material of the first photocatalyst layer 24, the reaction efficiency is not the maximum at such a thickness such that all light having absorbable wavelengths can be utilized. In a case where the thickness is large, it is difficult to transport the carriers generated in a location distant from a film surface without deactivating the carriers up to the film surface, due to the problems of the lifetime and the mobility of the carriers. For that reason, even in a case where the film thickness is increased, an expected electric current cannot be taken out.

Additionally, in a particle transfer electrode that is used well in a particle system, the larger the particle diameter, the rougher the electrode film becomes. As the thickness, that is, the particle diameter increases, the film density decreases, and an expected electric current cannot be taken out. The electric current can be taken out in a case where a thickness t (refer to FIG. 7) of the first photocatalyst layer 24 is 300 nm or more and 2 μm or less.

The thickness t (refer to FIG. 7) of the first photocatalyst layer 24 can be obtained from an acquired image by acquiring a sectional scanning electron microscope (SEM) image (refer to FIG. 8) of the oxygen generation electrode 12.

The above-described method for forming the first photocatalyst layer 24 is not limited, and well-known methods (for example, a method for depositing particle-shaped optical semiconductors on the substrates) can be adopted. The formation methods include, specifically, vapor phase film formation methods, such as an electron beam vapor deposition method, a sputtering method, and a chemical vapor deposition (CVD) method; a transfer method described in Chem. Sci., 2013, 4, and 1120 to 1124; and a method described in Adv. Mater., 2013, 25, and 125 to 131.

In addition, the other layer, for example, an adhesive layer may be included between a substrate and a photocatalyst layer as needed.

<First Co-Catalyst>

As the first co-catalyst 26, noble metals and transition metal oxides are used. The co-catalysts are carried and supported using a vacuum vapor deposition method, a sputtering method, an electrodeposition method, or the like.

In a case where the co-catalysts are formed with a set film thickness of, for example, about 1 5 nm, the co-catalysts are not formed as films but become island-like. As the first co-catalyst 26, for example, single substances constituted with Pt, Pd, Ni Au, Ag, Ru Cu, Co, Rh, Ir, Mn, Fe, or the like, alloys obtained by combining these single substances, and oxides of these single substances, for example, FeOx, CoOx such as CoO, NiOx, and $RuO_2$, may be used.

Next, the second conductive layer 32, the second photocatalyst layer 34, and the second co-catalyst 36 of the hydrogen generation electrode 14 will be described.

The second substrate 30 of the hydrogen generation electrode 14 illustrated in FIG. 10 supports the second photocatalyst layer 34, and is configured to have an electrical insulating property. Although the second substrate 30 is not particularly limited, for example, a soda lime glass substrate (hereinafter referred to as an SLG substrate) or a ceramic substrate can be used. Additionally, a substrate in which an insulating layer is formed on a metal substrate can be used as the second substrate 30. Here, as the metal substrate, a metal substrate, such as an Al substrate or a steel use stainless (SUS) substrate, or a composite metal substrate, such as a composite Al substrate formed of a composite material of Al, and for example, other metals, such as SUS, is available. In addition, the composite metal substrate is a kind of the metal substrate, and the metal substrate and the composite metal substrate are collectively and simply referred to as a metal substrate. Moreover, a metal substrate with an insulating film having an insulating layer formed by anodizing a surface of the Al substrate or the like can also be used as the second substrate 30. The second substrate 30 may be flexible or may not be flexible. In addition, in addition to the above-described substrates, for example, a glass plate formed of high strain point glass, non-alkali glass, or the like, or a polyimide substrate can also be used as the second substrate 30.

The thickness of the second substrate 30 is not particularly limited, may be about 20 to 2000 μm, is preferably 100 to 1000 μm, and is more preferably 100 to 500 μm. In addition, in a case where one including a copper indium gallium (di) selenide (CIGS) compound semiconductor is used as the second photocatalyst layer 34, photoelectric conversion efficiency is improved in a case where alkali ions (for example, sodium (Na) ions: Na+) are supplied to the second substrate 30 side. Thus, it is preferable to provide an alkali supply layer that supplies the alkali ions to a surface 20a of the second substrate 30. In addition, in a case where an alkali metal is included in the constituent elements of the second substrate 30, the alkali supply layer is unnecessary.

<Second Conductive Layer>

The second conductive layer 32 traps and transports the carriers generated in the second photocatalyst layer 34. Although the second conductive layer 32 is not particularly limited as long as the conductive layer has conductivity, the second conductive layer 32 is made of, for example, metals, such as Mo, Cr, and W, or combinations thereof. The second conductive layer 32 may have a single-layer structure, or may have a laminate structure, such as a two-layer structure. Among these, it is preferable that the second conductive layer 32 is formed of Mo. It is preferable that the second conductive layer 32 has a thickness of 200 to 1000 nm.

<Second Photocatalyst Layer>

The second photocatalyst layer 34 generates carriers by light absorption, and a conduction band lower end there is closer to a base side than an electrical potential ($H_2/H^+$) at which water is decomposed to generate hydrogen. Although the second photocatalyst layer 34 has p-type conductivity of generating holes and transporting the holes to the second conductive layer 32, it is also preferable to laminate the material having n-type conductivity on the surface 34a of the second photocatalyst layer 34 to form a pn junction. The thickness of the second photocatalyst layer 34 is preferably 1000 3000 nm.

The optical semiconductors constituting one having p-type conductivity are optical semiconductors containing at least one kind of metallic element. Among these, from a viewpoint of more excellent onset potential, higher photocurrent density, or more excellent durability against continuation irradiation, as metallic elements, Ti, V, Nb, Ta, W, Mo, Zr, Ga, In, Zn, Cu, Ag, Cd, Cr, or Sn is preferable, and Ga, In, Zn, Cu, Zr, or Sn is more preferable.

Additionally, the optical semiconductor includes oxides, nitrides, oxynitrides, (oxi)calcogenides, and the like including the above-described metallic elements, and is preferably constituted with GaAs, GaInP, AlGaInP, CdTe, CuInGaSe, CIGS compound semiconductors including a chalcopyrite crystal structure, or CZTS compound semiconductors, such as $Cu_2ZnSnS_4$.

It is particularly preferable that the CIGS compound semiconductor is constituted with a CIGS compound semiconductor or a CZTS compound semiconductor of $Cu_2ZnSnS_4$ or the like, which has a chalcopyrite crystal structure.

The CIGS compound semiconductor layer may be constituted of $CuInSe_2$ (CIS), $CuGaSe_2$ (CGS), or the like as well as $Cu(In, Ga)Se_2$ (CIGS). Moreover, the CIGS compound semiconductor layer is may be configured by substituting all or part of Se with S.

In addition, as methods for forming the CIGS compound semiconductor layer, 1) a multi-source vapor deposition method, 2) a selenide method, 3) a sputtering method, 4) a hybrid sputtering method, 5) a mechanochemical process method, and the like are known. Other methods for forming the CIGS compound semiconductor layer include a screen printing method, a proximity sublimating method, a metal organic chemical vapor deposition (MOCVD) method, a spraying method (wet film formation method), and the like. For example, in the screen printing method (wet film formation method), a spraying method (wet film formation method), a molecular beam epitaxy (MBE) method, or the like, crystal having a desired composition can be obtained by forming a particulate film including an 11 group element, a 13 group element, and a 16 group element on a substrate, and executing thermal decomposition processing (may be thermal decomposition processing in a 16 group element atmosphere in this case) or the like (JP1997-74065A (JP-H09-74065A), JP1997-74213A (JP-H09-74213A), or the like). Hereinafter, a CIGS compound semiconductor layer is also simply referred to as a CIGS layer.

In a case where the material having n-type conductivity is laminated on the surface 34a of the second photocatalyst layer 34 as described above, the pn junction is formed.

It is preferable that the material having n-type conductivity is formed of one including metal sulfide including at least one kind of metallic element selected from a group consisting of, for example, Cd, Zn, Sn, and In, such as CdS, ZnS, Zn(S, O), and/or Zn(S, O, OH), SnS, Sn(S, O), and/or Sn(S, O, OH), InS, In(S, O), and/or In(S, O, OH). It is preferable that the film thickness of a layer of the material having n-type conductivity is 20 to 100 nm. The layer of the material having n-type conductivity is formed by, for example, a chemical bath deposition (CBD) method.

In a case where an inorganic semiconductor can be formed, a photolysis reaction of water can be caused, and hydrogen can be generated, the configuration of the second photocatalyst layer 34 is not particularly limited.

For example, photoelectric conversion elements used for solar battery cells that constitute a solar battery are preferably used. As such photoelectric conversion elements, in addition to those using the above-described CIGS compound semiconductor or CZTS compound semiconductor such as $Cu_2ZnSnS_4$, thin film silicon-based thin film type photoelectric conversion elements, CdTe-based thin film type photoelectric conversion elements, dye-sensitized thin film type photoelectric conversion elements, or organic thin film type photoelectric conversion elements can be used.

<Second Co-Catalyst>

As the second co-catalyst 36, it is preferable that, for example, Pt, Pd, Ni, Ag, Ru, Cu, Co, Rh, Ir, Mn, and $RuO_2$ are used.

A transparent conductive layer (not illustrated) may be provided between the second photocatalyst layer 34 and the second co-catalyst 36. The transparent conductive layer needs a function of electrically connecting the second photocatalyst layer 34 and the second co-catalyst 36 to each other, transparency, water resistance, and water impermeability are also required for the transparent conductive layer, and the durability of the hydrogen generation electrode 14 is improved by the transparent conductive layer.

It is preferable that the transparent conductive layer is formed of, for example, metals, conductive oxides (of which the overvoltage is equal to or lower than 0.5 V), or composites thereof. The transparent conductive layer is appropriately selected in conformity with the absorption wavelength of the second photocatalyst layer 34. Transparent conductive films formed of ZnO that is doped with indium tin oxide (ITO), fluorine-doped tin oxide (PTO), Al, B, Ga, In, or the like, or IMO ($In_2O_3$ doped with Mo) can be used for the transparent conductive layer. The transparent conductive layer may have a single-layer structure, or may have a laminate structure, such as a two-layer structure. Additionally, the thickness of the transparent conductive layer is not particularly limited, and is preferably 30 to 500 nm.

In addition, although methods for forming the transparent conductive layer are not particularly limited, a vacuum film deposition method is preferable. The transparent conductive layer 46 can be formed by vapor phase film formation methods, such as an electron beam deposition method, a sputtering method, or a chemical vapor deposition (CVD) method.

Additionally, instead of the transparent conductive layer, a protective film that protects the second co-catalyst 36 may be provided on the surface of the second co-catalyst 36.

The protective film is configured in conformity with the absorption wavelength of the second co-catalyst 36. For example, oxides, such as $TiO_2$, $ZrO_2$, and $Ga_2O_3$, are used for the protective film. In a case where the protective film is an insulator, for example, the thickness thereof is 5 to 50 nm, and film formation methods, such as an atomic layer deposition (ALD) method, are selected. In a case where the protective film is conductive, for example, the protective film has a thickness of 5 to 500 nm, and may be formed by a sputtering method and the like in addition to the atomic layer deposition (ALD) method and a chemical vapor deposition (CVD) method. The protective film can be made thicker in a case where the protective film is a conductor than in a case where the protective film is insulating.

The invention is basically configured as described above. Although the artificial photosynthesis module of the invention has been described above in detail, the invention is not limited to the above-described embodiment, and various improvements and modifications may be made without departing from the scope of the invention.

EXAMPLES

Hereinafter, the features of the invention will be more specifically described with reference to examples. Materials, reagents, amounts used, the substance amounts, ratios, treatment contents, treatment procedures, and the like that are shown in the following examples can be appropriately changed, unless departing from the spirit of the invention. Therefore, the scope of the invention should not be restrictively interpreted by the specific examples shown below.

In the present embodiment, artificial photosynthesis modules of Example 1, Example 2, Example 3, and Comparative Example 1 were made. The current densities of oxygen generation electrodes of the artificial photosynthesis modules were measured for Example 1, Example 2, Example 3, and Comparative Example 1, and the water decomposition current densities of the artificial photosynthesis modules were measured for Example 1, Example 2, and Comparative Example 1. The results are illustrated in the following Table 1 and FIGS. 21 and 22.

Each of the artificial photosynthesis modules of Example 1, Example 2, Example 3, and Comparative Example 1 is disposed within a container (not illustrated) with which an electrolytic solution to be described below is filled.

The current densities and the water decomposition current densities of the oxygen generation electrodes were obtained by irradiating the artificial photosynthesis modules of Example 1, Example 2, Example 3, and Comparative Example 1 with pseudo-solar light, respectively, to measure photocurrents.

Regarding the current densities of the oxygen generation electrodes, the photocurrents were measured within a preset electrical potential range of 0.2 to 1.3 $V_{RHE}$. Reaction efficiencies were evaluated in current densities (mA/cm$^2$) at 0.6 $V_{RHE}$.

Additionally, the photocurrents were measured within a preset electrical potential range of 0.2 to 1.3 $V_{RHE}$. The reaction efficiencies were evaluated in current densities (mA/cm$^2$) at 1.2 $V_{RHE}$.

Regarding the current densities of the oxygen generation electrodes, a reference electrode and a counter electrode were disposed within a container. Then, each oxygen generation electrode, the reference electrode, and the counter electrode were connected to a potentiostat. In this case, the oxygen generation electrode becomes a working electrode.

The water decomposition current densities of the artificial photosynthesis modules of Example 1, Example 2, and Comparative Example 1 are average values of the current densities in a case where the one-hour continuous driving was performed.

Regarding the artificial photosynthesis modules of Example 1, Example 2, and Comparative Example 1, pseudo-solar light was radiated as described above on a condition with no external application voltage to perform a water decomposition operation continuously for one hour, photocurrents were measured during that, the average values of the current densities in a case where one-hour continuous driving was performed were obtained, and the above-described water decomposition current densities were obtained.

A light source of the pseudo-solar light, the electrolytic solution, the reference electrode, the counter electrodes, and the potentiostat are shown below.

Light source of pseudo-solar light: solar simulator (air mass (AM) 1.5G), XES-70S1 made by SAN-EI ELECTRIC CO. LTD Electrolytic solution: 1M $H_3BO_3$+KOH pH9.5

Electrochemical measuring device: potentiostat, HZ-5000 made by HOKUTO DENKO CORP. Reference electrode: Ag/AgCl electrode Counter electrode: platinum wire Next, the artificial photosynthesis modules of Example 1, Example 2, Example 3, and Comparative Example 1 will be described.

Example 1

Figure 18:
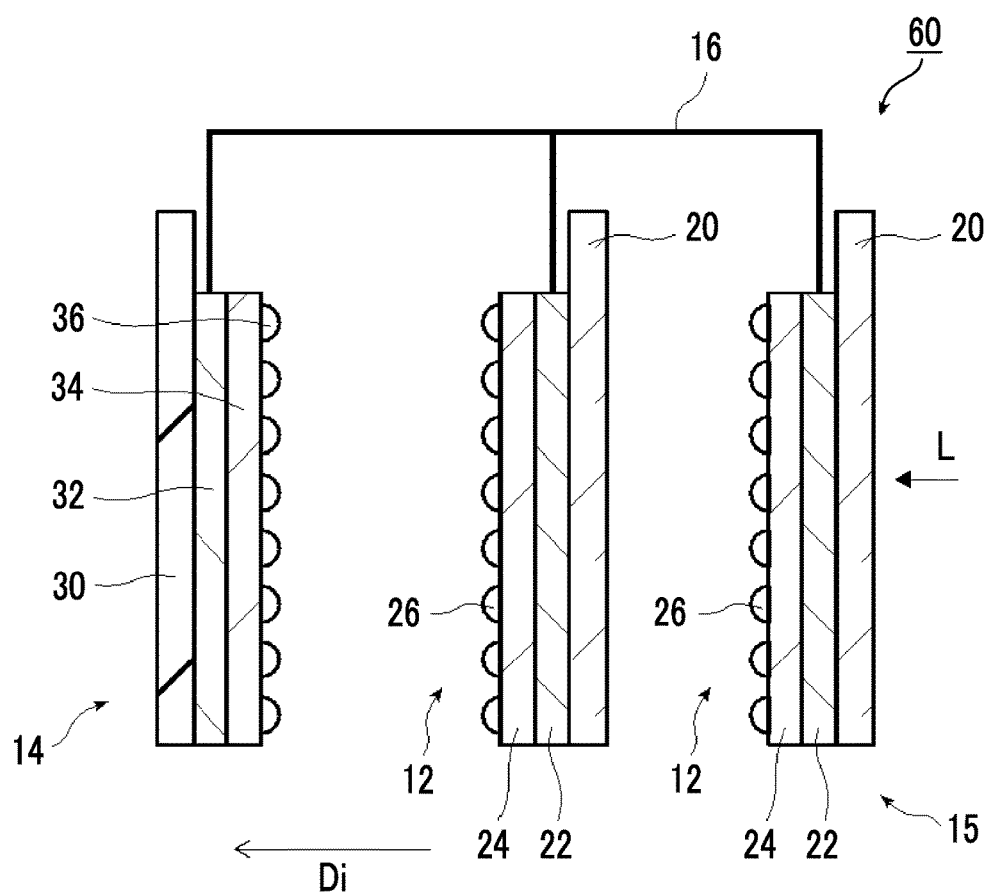
FIG. 18 is a schematic view illustrating the configuration of Example 1.

Example 1 is an artificial photosynthesis module 60 illustrated in FIG. 18. In addition, in an artificial photosynthesis module 60 illustrated in FIG. 18, the same components as those of the artificial photosynthesis module 10 illustrated in FIG. 5 will be designated by the same reference signs, and the detailed description thereof will be omitted.

The artificial photosynthesis module 60 illustrated in FIG. 18 has two oxygen generation electrodes 12 and one hydrogen generation electrode 14, and the two oxygen generation electrodes 12 and the one hydrogen generation electrode 14 are disposed in series in the traveling direction Di of the light L. The light L is incident from the oxygen generation electrode 12 side, and all the oxygen generation electrodes 12 have the first co-catalyst 26 on the side opposite to the incidence side of the light L with respect to the first substrate 20.

A method of making the oxygen generation electrodes 12 and the hydrogen generation electrode 14 will be described.

(Method of Making Oxygen Generation Electrode)

First, a solution in which bismuth nitrate pentahydrate and sodium iodide are dissolved with nitric acid of pH 1.7 is prepared. This solution is mixed with a solution in which 1,4-benzoquinone is dissolved in ethanol, and the mixed solution is dissolved. The made solution is put into a container for electrodeposition (a three-electrode system cell), a soda lime glass substrate on which an indium tin oxide (ITO) film is formed is set for a working electrode, an Ag/AgCl electrode is set for a reference electrode, and a platinum wire is set for a counter electrode. The soda lime glass substrate is the second substrate, and the ITO layer is the second conductive layer.

Electrodeposition is performed for 10 minutes while the working electrode maintains a potential range of −0.1 to −0.3 V with respect to the reference electrode.

A BiOI thin film precursor is obtained by drying the electrodeposited electrodes. Next, after the BiOI thin film precursor is immersed in a dimethyl sulfoxide solution of bis(acetylacetonato) vanadyl, baking is performed at 450° C. After the baking, a vanadium oxide remaining on the film surface is removed by being immersed in a sodium hydroxide aqueous solution. In this way, a BiVO$_4$ layer can be formed. The BiVO$_4$ layer us the second photocatalyst layer.

Next, Fe particles were made to be carried and supported with a set film thickness of 1 nm on the BiVO$_4$ by the sputtering method and Ni particles were made to be co-carried and co-supported with a set film thickness of 1 nm by the sputtering method to obtain an oxygen generation electrode. The first co-catalyst 26 are formed of the Fe particles and the Ni particles. The Fe particles and the Ni particles is the co-catalyst particles 27.

(Method of Making Hydrogen Generation Electrode)

A soda lime glass substrate having a thickness of 1 mm was prepared as the second substrate 30, and a molybdenum film having a thickness of 500 nm was formed on a surface of this soda lime glass substrate by the sputtering method to obtain the second conductive layer 32. Next, a CIGS layer having a thickness of 1500 nm was formed as the second photocatalyst layer 34 on the second conductive layer 32. Next, a CdS layer having a thickness of 50 nm was formed as the layer (not illustrated) of the material having n-type conductivity on the second photocatalyst layer 34 by the chemical bath deposition (CBD) method. Accordingly, a pn junction was formed. Hereinafter, the substrate in this state is referred to as a CIGS substrate. The CIGS substrate was cut into 1 cm×1 cm. Next, Pt particles were made to be carried and supported with a set film thickness of 2 nm on the layer of the material having n-type conductivity by the sputtering method to obtain an island-like second co-catalyst 36. The Pt particles are equivalent to the co-catalyst particles 37.

The oxygen generation electrodes and the hydrogen generation electrode that were obtained were connected to each other by a conducting wire, and the artificial photosynthesis module 60 was obtained. The artificial photosynthesis module 60 is the two-electrode water decomposition module.

Example 2

Figure 19:
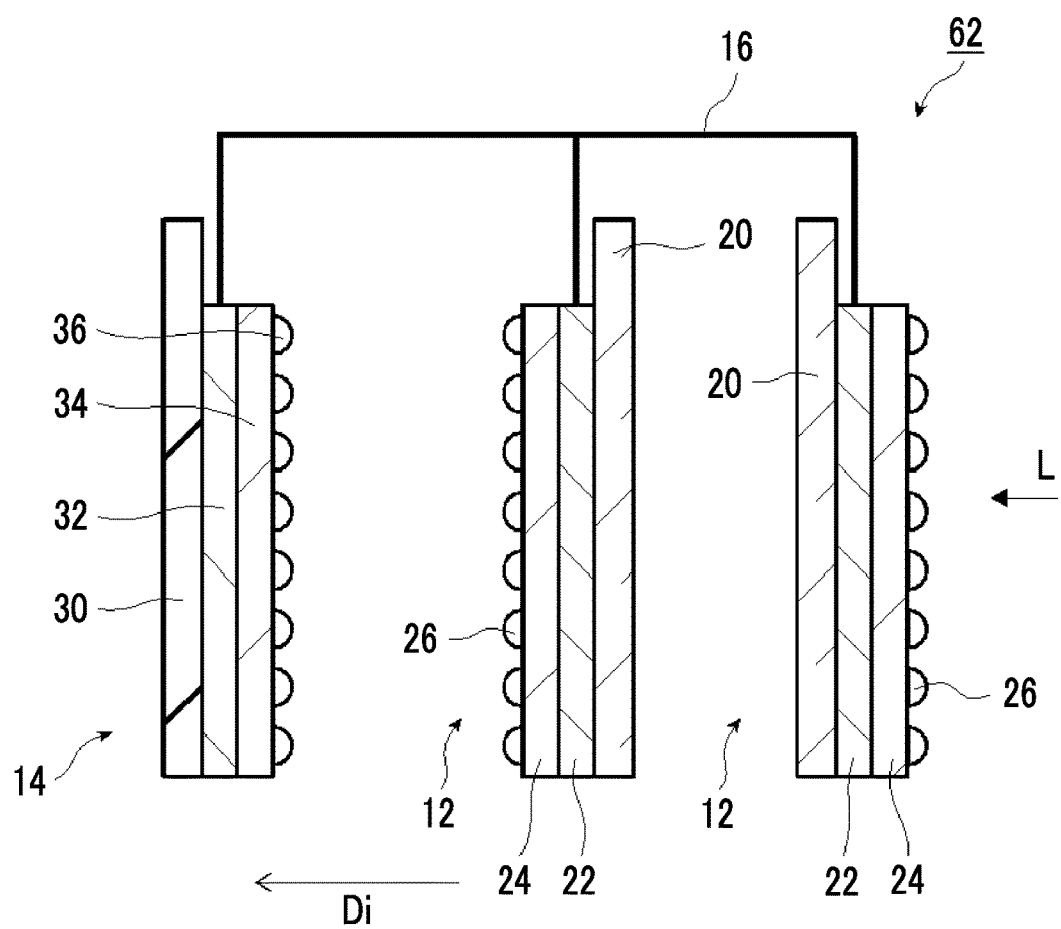
FIG. 19 is a schematic view illustrating the configuration of Example 2.

Example 2 is an artificial photosynthesis module 62 illustrated in FIG. 19. The artificial photosynthesis module 62 of Example 2 has the same configuration as the artificial photosynthesis module 60 illustrated in FIG. 18 except that, in the first oxygen generation electrode 12, the first co-catalyst 26 is provided on the incidence side of the light L as compared to Example 1.

Example 3

An artificial photosynthesis module of Example 3 has the same configuration as the artificial photosynthesis module 60 illustrated in FIG. 18 except that the number of oxygen generation electrodes 12 is three (refer to FIG. 14) as compared to Example 1.

Comparative Example 1

Figure 20:
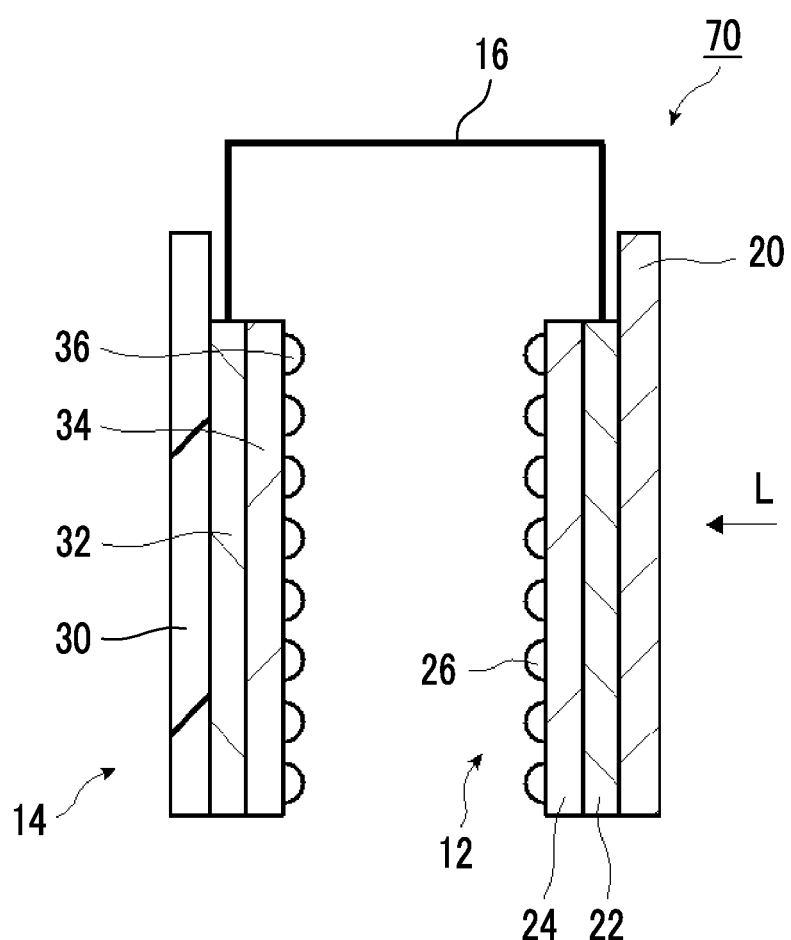
FIG. 20 is a schematic view illustrating the configuration of Comparative Example 1.

Comparative Example 1 is an artificial photosynthesis module 70 illustrated in FIG. 20. The artificial photosynthesis module 70 of Comparative Example 1 has the same configuration as the artificial photosynthesis module 60 illustrated in FIG. 18 except that one oxygen generation electrodes 12 is provided as compared to Example 1.

Figure 21:
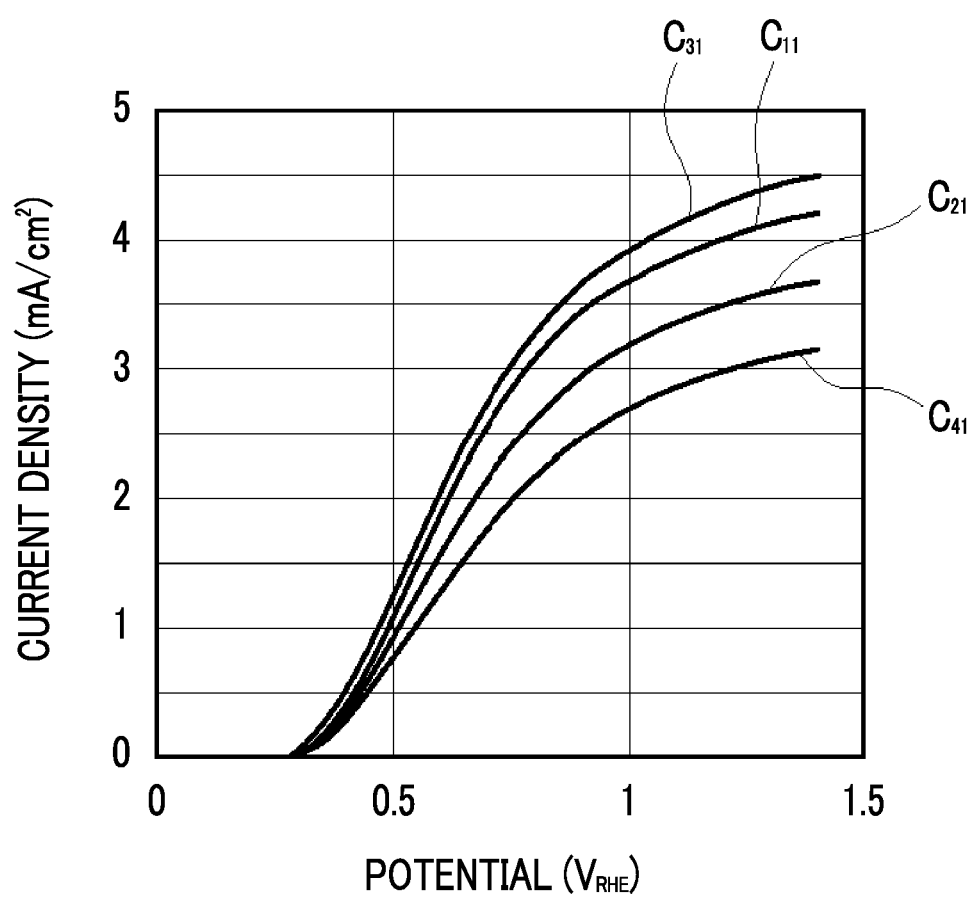
FIG. 21 is a graph illustrating changes in current density.
Figure 22:
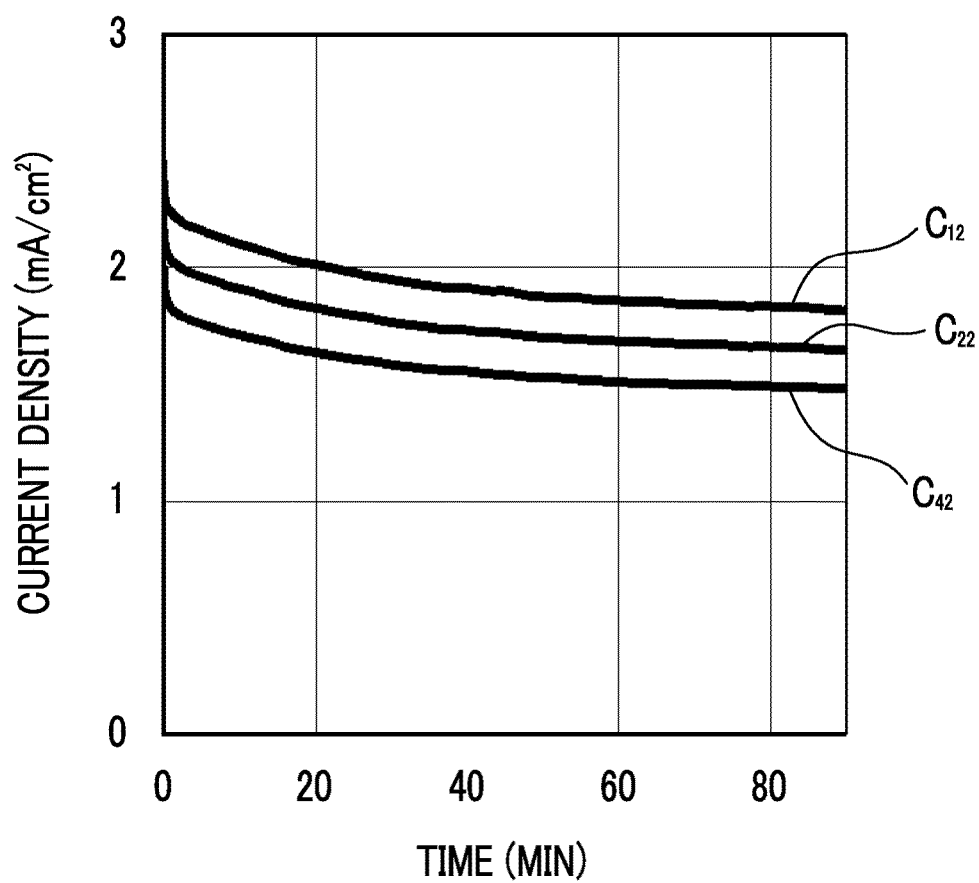
FIG. 22 is a graph illustrating changes in water decomposition current density in a case where continuously driven.

Here, FIG. 21 is a graph illustrating changes in the current densities of Examples 1 to 3 and Comparative Example 1, and FIG. 22 is a graph illustrating changes in the water decomposition current densities in a case where Example 1, Example 2, and Comparative Example 1 are continuously driven.

In FIG. 21, a curve $C_{11}$ represents Example 1, a curve $C_{21}$ represents Example 2, a curve $C_{31}$ represents Example 3, and a curve $C_{41}$ represents Comparative Example 1. In FIG. 22, a curve $C_{12}$ represents Example 1, a curve $C_{22}$ represents Example 2, and a curve $C_{42}$ represents Comparative Example 1. Since the water decomposition current density of the artificial photosynthesis module was not measured in Example 3, "-" was written in the column of "Water Decomposition Current Density" of the following Table 1.

TABLE 1

|  | Example 1 | Example 2 | Example 3 | Comparative Example 1 |
| --- | --- | --- | --- | --- |
| Oxygen-Generation-Side Current Density (1.2 $V_{RHE}$) | 4 mA/cm$^2$ | 3.5 mA/cm$^2$ | 4.2 mA/cm$^2$ | 3 mA/cm$^2$ |
| Oxygen-Generation-Side Current Density (0.6 $V_{RHE}$) | 2.5 mA/cm$^2$ | 2 mA/cm$^2$ | 2.6 mA/cm$^2$ | 1.5 mA/cm$^2$ |
| Water Decomposition Current Density (One-Hour Average Value) | 2 mA/cm$^2$ | 1.8 mA/cm$^2$ | — | 1.4 mA/cm$^2$ |

From FIG. 21, FIG. 22, and Table 1, in Example 1, Example 2, and Example 3, as compared to Comparative Example 1, excellent results were obtained even in a case where oxygen-generation-side current density is a current density (mA/cm$^2$) at 0.6 $V_{RHE}$ or a current density (mA/cm$^2$) at 1.2 $V_{RHE}$. Moreover, excellent results excellent were also obtained regarding the water decomposition current densities.

In Example 1, as compared to Example 2, in all the oxygen generation electrodes, the second co-catalyst is provided on the side opposite to the incidence direction side of the light. Therefore, more excellent results than those of Example 2 were obtained regarding the cases where the oxygen-generation-side current density is the current density (mA/cm$^2$) at 0.6 $V_{RHE}$ and the current density (mA/cm$^2$) at 1.2 $V_{RHE}$. Additionally, in Example 1, more excellent results than those Example 2 were also obtained regarding the water decomposition current densities.

In Example 3, the number of oxygen generation electrodes was greater than that of Example 1, and more excellent results than those of Example 1 were obtained regarding the cases where the oxygen-generation-side current density is the current density (mA/cm$^2$) at 0.6 $V_{RHE}$ and the current density (mA/cm$^2$) at 1.2 $V_{RHE}$.

EXPLANATION OF REFERENCES 10, 10a, 60, 62, 70: artificial photosynthesis module
12: hydrogen generation electrode
14: oxygen generation electrode
15: oxygen generation electrode group
16: conducting wire
20: first substrate
20a, 22a, 24a, 30a, 32a, 34a, 54a: surface
22: first electrode
24: first photocatalyst layer
26: first co-catalyst 27, 37: co-catalyst particles
30: second substrate
32: second electrode
36: second photocatalyst layer
50: container
52: housing
52b: bottom surface:
52c: first wall surface
52d second wall surface
53: diaphragm
53a: first partition
53b: second partition
54: transparent member
56, 56a, 56b: supply pipe
58, 58a, 58b: discharge pipe
100, 100a, 100b: photocatalyst electrode
102, 103: substrate
104, 105: conductive layer
106, 107: photocatalyst layer
108: carrier
AQ: electrolytic aqueous solution
B: horizontal plane
C11, C21, C31, C41: curve
C12, C22, C42: curve
D: direction
Di: traveling direction
L: light
θ: angle

What is claimed is:

1. An artificial photosynthesis module comprising an oxygen generation electrode that decomposes water with light to generate oxygen and a hydrogen generation electrode that decomposes the water with the light to generate hydrogen,
    wherein the oxygen generation electrode has a first substrate, a first conductive layer provided on the first substrate, a first photocatalyst layer provided on the first conductive layer, and a first co-catalyst carried and supported on at least a part of the first photocatalyst layer,
    wherein the hydrogen generation electrode has a second substrate, a second conductive layer provided on the second substrate, a second photocatalyst layer provided on the second conductive layer, and a second co-catalyst carried and supported on at least a part of the second photocatalyst layer, and
    wherein the artificial photosynthesis module includes:
    a plurality of the oxygen generation electrodes,
    wherein the plurality of the oxygen generation electrodes are positioned such that the first substrate of the oxygen generation electrode is perpendicular to a traveling direction of the light along the traveling direction of the light, and are positioned to face each other in parallel to the first substrate, and
    wherein at least the first substrates of the plurality of oxygen generation electrodes excluding a first substrate of the oxygen generating electrode disposed at the end of the traveling direction of the light are transparent.

2. The artificial photosynthesis module according to claim 1,
    wherein the plurality of the oxygen generation electrodes and the hydrogen generation electrode are disposed in series in the traveling direction of the light.

3. The artificial photosynthesis module according to claim 1,
    wherein the light is incident from the oxygen generation electrode side, and all of the first substrates are transparent.

4. The artificial photosynthesis module according to claim 1,
    wherein an oxygen generation electrode on which the light is first incident among the plurality of oxygen generation electrodes has the first co-catalyst on a side of the first substrate opposite to an incidence side of the light.

5. The artificial photosynthesis module according to claim 1,
    wherein all the plurality of oxygen generation electrodes each have the first co-catalyst on a side of the first substrate opposite to an incidence side of the light.

6. The artificial photosynthesis module according to claim 1,
    wherein a thickness of the first photocatalyst layer of each of the plurality of oxygen generation electrodes is 300 nm or more and 2 μm or less.

7. The artificial photosynthesis module according to claim 1,
    wherein the number of the oxygen generation electrodes is 2 or more and 5 or less.

8. The artificial photosynthesis module according to claim 7,
    wherein the 2 or more and 5 or less oxygen generation electrodes are disposed along the traveling direction of the light, and wherein an oxygen generation electrodes being disposed at the end of the 2 or more and 5 or less oxygen generation electrodes in the traveling direction and the hydrogen generating electrode are disposed in parallel in a direction orthogonal to the traveling direction.

9. The artificial photosynthesis module according to claim 1,
    wherein, in a case where an absorption end of the first photocatalyst layer is defined as $\lambda_1$ and an absorption end of the second photocatalyst layer is defined as $\lambda_2$, $\lambda_1 < \lambda_2$ and $\lambda_2 - \lambda_1 \geq 100$ nm are satisfied.

10. The artificial photosynthesis module according to claim 1,
    wherein the second co-catalyst of the hydrogen generation electrode is provided on the incidence side of the light of the second substrate.

* * * * *